United States Patent
Rostoker et al.

(10) Patent No.: US 9,370,086 B2
(45) Date of Patent: *Jun. 14, 2016

(54) FORMATION OF A FIELD REVERSED CONFIGURATION FOR MAGNETIC AND ELECTROSTATIC CONFINEMENT OF PLASMA

(75) Inventors: Norman Rostoker, Irvine, CA (US);
Michl Binderbauer, Irvine, CA (US);
Eusebio Garate, Irvine, CA (US);
Vitaly Bystritskii, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,884

(22) Filed: Nov. 2, 2009

(65) Prior Publication Data
US 2010/0046687 A1    Feb. 25, 2010

Related U.S. Application Data

(63) Continuation of application No. 11/707,282, filed on Feb. 16, 2007, now Pat. No. 7,613,271, which is a continuation of application No. 11/074,615, filed on Mar. 7, 2005, now Pat. No. 7,477,718, which is a
(Continued)

(51) Int. Cl.
*G21B 1/05* (2006.01)
*H05H 1/16* (2006.01)
(Continued)

(52) U.S. Cl.
CPC .................. *H05H 1/16* (2013.01); *G21B 1/052* (2013.01); *G21D 7/00* (2013.01); *H05H 1/03* (2013.01); *H05H 1/14* (2013.01); *Y02E 30/122* (2013.01)

(58) Field of Classification Search
None
See application file for complete search history.

(56) References Cited

U.S. PATENT DOCUMENTS

| | | | |
|---|---|---|---|
| 3,036,963 A | 5/1962 | Christofilos | |
| 3,071,525 A | 1/1963 | Christofilos | |

(Continued)

FOREIGN PATENT DOCUMENTS

| | | |
|---|---|---|
| BE | 825258 | 5/1975 |
| GB | 1 387 098 | 3/1975 |

(Continued)

OTHER PUBLICATIONS

Rostoker et al., "Fusion Reactors Based on Colliding Beams in a Field Reversed Configuration Plasma", Comments Plasma Phys. Controlled Fusion, 1997, vol. 18, No. 1, pp. 11-23.*

(Continued)

*Primary Examiner* — Jack W Keith
*Assistant Examiner* — Sean P Burke
(74) *Attorney, Agent, or Firm* — One LLP

(57) ABSTRACT

A system and method for containing plasma and forming a Field Reversed Configuration (FRC) magnetic topology are described in which plasma ions are contained magnetically in stable, non-adiabatic orbits in the FRC. Further, the electrons are contained electrostatically in a deep energy well, created by tuning an externally applied magnetic field. The simultaneous electrostatic confinement of electrons and magnetic confinement of ions avoids anomalous transport and facilitates classical containment of both electrons and ions. In this configuration, ions and electrons may have adequate density and temperature so that upon collisions they are fused together by nuclear force, thus releasing fusion energy. Moreover, the fusion fuel plasmas that can be used with the present confinement system and method are not limited to neutronic fuels only, but also advantageously include advanced fuels.

15 Claims, 16 Drawing Sheets

Related U.S. Application Data continuation of application No. 10/328,674, filed on Dec. 23, 2002, now Pat. No. 6,891,911, which is a continuation of application No. 10/066,424, filed on Jan. 31, 2002, now Pat. No. 6,664,740.

(60) Provisional application No. 60/266,074, filed on Feb. 1, 2001, provisional application No. 60/297,086, filed on Jun. 8, 2001.

(51) Int. Cl.
*G21D 7/00* (2006.01)
*H05H 1/14* (2006.01)
*H05H 1/03* (2006.01)

(56) References Cited

U.S. PATENT DOCUMENTS

| | | |
|---|---|---|
| 3,120,470 A | 2/1964 | Imhoff et al. |
| 3,132,996 A | 5/1964 | Baker et al. |
| 3,170,841 A | 2/1965 | Post |
| 3,182,213 A | 5/1965 | Rosa |
| 3,258,402 A | 6/1966 | Farnsworth |
| 3,386,883 A | 6/1968 | Farnsworth |
| 3,527,977 A | 9/1970 | Ruark |
| 3,530,036 A | 9/1970 | Hirsch |
| 3,530,497 A | 9/1970 | Hirsch et al. |
| 3,577,317 A | 5/1971 | Woods |
| 3,621,310 A | 11/1971 | Takeuchi et al. |
| 3,663,362 A | 5/1972 | Stix |
| 3,664,921 A | 5/1972 | Christofilos |
| 3,668,065 A | 6/1972 | Moir |
| 3,859,164 A | 1/1975 | Nowak |
| 4,010,396 A | 3/1977 | Ress et al. |
| 4,054,846 A | 10/1977 | Smith et al. |
| 4,057,462 A | 11/1977 | Jassby et al. |
| 4,065,351 A | 12/1977 | Jassby et al. |
| 4,098,643 A | 7/1978 | Brown |
| 4,182,650 A | 1/1980 | Fischer |
| 4,189,346 A | 2/1980 | Jarnagin |
| 4,202,725 A | 5/1980 | Jarnagin |
| 4,233,537 A | 11/1980 | Limpaecher |
| 4,246,067 A | 1/1981 | Linlor |
| 4,267,488 A | 5/1981 | Wells |
| 4,274,919 A | 6/1981 | Jensen et al. |
| 4,303,467 A | 12/1981 | Scornavacca et al. |
| 4,314,879 A | 2/1982 | Hartman et al. |
| 4,317,057 A | 2/1982 | Bazarov et al. |
| 4,347,621 A | 8/1982 | Dow |
| 4,350,927 A | 9/1982 | Maschke |
| 4,371,808 A | 2/1983 | Urano et al. |
| 4,390,494 A | 6/1983 | Salisbury |
| 4,397,810 A | 8/1983 | Salisbury |
| 4,416,845 A | 11/1983 | Salisbury |
| 4,434,130 A | 2/1984 | Salisbury |
| 4,483,737 A | 11/1984 | Mantei |
| 4,543,231 A | 9/1985 | Ohkawa |
| 4,543,465 A | 9/1985 | Sakudo et al. |
| 4,548,782 A | 10/1985 | Manheimer et al. |
| 4,560,528 A | 12/1985 | Ohkawa |
| 4,584,160 A | 4/1986 | Kageyama |
| 4,584,473 A | 4/1986 | Hashimoto et al. |
| 4,601,871 A | 7/1986 | Turner |
| 4,615,755 A | 10/1986 | Tracy et al. |
| 4,618,470 A | 10/1986 | Salisbury |
| 4,630,939 A | 12/1986 | Mayes |
| 4,639,348 A | 1/1987 | Jarnagin |
| 4,650,631 A | 3/1987 | Knorr |
| 4,687,616 A | 8/1987 | Moeller |
| 4,826,646 A | 5/1989 | Bussard |
| 4,853,173 A | 8/1989 | Stenbacka |
| 4,894,199 A | 1/1990 | Rostoker |
| 4,904,441 A | 2/1990 | Sorensen et al. |
| 5,015,432 A | 5/1991 | Koloc |
| 5,041,760 A | 8/1991 | Koloc |
| 5,160,694 A | 11/1992 | Steudtner |
| 5,160,695 A | 11/1992 | Bussard |
| 5,206,516 A | 4/1993 | Keller et al. |
| 5,207,760 A | 5/1993 | Dailey et al. |
| 5,339,336 A | 8/1994 | Sudan |
| 5,355,399 A | 10/1994 | Golovanivsky et al. |
| 5,420,425 A | 5/1995 | Bier et al. |
| 5,422,481 A | 6/1995 | Louvet |
| 5,473,165 A | 12/1995 | Stinnett et al. |
| 5,483,077 A | 1/1996 | Glavish |
| 5,502,354 A | 3/1996 | Correa et al. |
| 5,537,005 A | 7/1996 | Goebel et al. |
| 5,557,172 A | 9/1996 | Tanaka |
| 5,656,819 A | 8/1997 | Greenly |
| 5,677,597 A | 10/1997 | Tanaka |
| 5,747,800 A | 5/1998 | Yano et al. |
| 5,764,715 A | 6/1998 | Maenchen et al. |
| 5,811,201 A | 9/1998 | Skowronski |
| 5,846,329 A | 12/1998 | Hori et al. |
| 5,848,110 A | 12/1998 | Maenchen et al. |
| 5,923,716 A | 7/1999 | Meacham |
| 6,084,356 A | 7/2000 | Seki et al. |
| 6,248,251 B1 | 6/2001 | Sill |
| 6,255,648 B1 | 7/2001 | Littlejohn et al. |
| 6,271,529 B1 | 8/2001 | Farley et al. |
| 6,322,706 B1 | 11/2001 | Ohkawa |
| 6,335,535 B1 | 1/2002 | Miyake et al. |
| 6,345,537 B1 | 2/2002 | Salamitou |
| 6,390,019 B1 | 5/2002 | Grimbergen et al. |
| 6,396,213 B1 | 5/2002 | Koloc |
| 6,408,052 B1 | 6/2002 | McGeoch |
| 6,452,168 B1 | 9/2002 | McLuckey et al. |
| 6,477,216 B2 | 11/2002 | Koloc |
| 6,488,807 B1 | 12/2002 | Collins et al. |
| 6,593,539 B1 | 7/2003 | Miley et al. |
| 6,611,106 B2 | 8/2003 | Rostoker et al. |
| 6,628,740 B2 | 9/2003 | Monkhorst et al. |
| 6,632,324 B2 | 10/2003 | Chan |
| 6,664,740 B2 | 12/2003 | Rostoker et al. |
| 6,712,927 B1 | 3/2004 | Grimbergen et al. |
| 6,755,086 B2 | 6/2004 | Salamitou et al. |
| 6,850,011 B2 | 2/2005 | Monkhorst et al. |
| 6,852,942 B2 | 2/2005 | Monkhorst et al. |
| 6,888,907 B2 | 5/2005 | Monkhorst et al. |
| 6,891,911 B2 | 5/2005 | Rostoker et al. |
| 6,894,446 B2 | 5/2005 | Monkhorst et al. |
| 6,995,515 B2 | 2/2006 | Rostoker et al. |
| 7,002,148 B2 | 2/2006 | Monkhorst et al. |
| 7,015,646 B2 | 3/2006 | Rostoker et al. |
| 7,026,763 B2 | 4/2006 | Rostoker et al. |
| 7,115,887 B1 | 10/2006 | Hassanein et al. |
| 7,126,284 B2 | 10/2006 | Rostoker et al. |
| 7,129,656 B2 | 10/2006 | Rostoker et al. |
| 7,180,242 B2 * | 2/2007 | Rostoker et al. ......... 315/111.21 |
| 7,439,678 B2 | 10/2008 | Rostoker et al. |
| 2001/0006093 A1 | 7/2001 | Tabuchi et al. |
| 2001/0035498 A1 | 11/2001 | Li |
| 2003/0197129 A1 | 10/2003 | Murrell et al. |

FOREIGN PATENT DOCUMENTS

| | | | |
|---|---|---|---|
| RU | 2 056 649 | 3/1996 | |
| WO | WO 97/10605 | * 3/1997 | ............... G21B 1/00 |
| WO | WO 99/65056 | 12/1999 | |

OTHER PUBLICATIONS

Wessel, et al. al., "Colliding Beam Fusion Reactor", Space Technology and Applications International Forum—2000, pp. 1425-1430.*
Moir and Golston, Comments on Fusion Alternatives, Science Dec. 19, 1997.*
Carlson, "Annotated bibliography of p-B11 fusion", Aug. 1998.*
Carlson, "Fundamental Limitations on Plasma Fusion Systems Not in Thermodynamic Equilibrium", May 8, 2001.*
Carlson, "Re: Boron/Proton colliding beam fusion reactor?", Oct. 25, 2001.*
Home Page of Dr. A. Carlson.*
Carlson, "Re:Lithium Fission—why not?", Sep. 14, 2000.*

(56) References Cited

OTHER PUBLICATIONS

Rostoker et al., "Colliding Beam Fusion Reactor", Science, vol. 278, Nov. 21, 1997, pp. 1419-1422.*
A White Paper on FRC Development, Apr. 1998.*
Nevins, et al., "Feasibility of a Colliding Beam Fusion Reactor," Science 281, 307a (1998).*
Lampe, Comments on the Colliding Beam Fusion Reactorc Proposed by Rostoker, Binderbauer and Monkhorst for Use with the p-B11 Fusion Reaction, NRL/MR/6709—98-8305, Oct. 30, 1998.*
Rider, A general critique of inertial-electrostatic confinement fusion systems, Phys. Plasmas 2(6), Jun. 1995, pp. 1853-1872.*
U.S. Appl. No. 11/709,995—Office Action, Sep. 16, 2009.
U.S. Appl. No. 11/371,207—Office Action, Sep. 18, 2009.
U.S. Appl. No. 11/371,196—Office Action, Oct. 14, 2009.
Anderson et al., "Plasma and Ion Beam Injection into an FRC", Plasma Physics Reports, vol. 31, No. 10, pp. 809-817((9) (Oct. 2005).
Arsenin at al., "Suppression of plasma instabilities by the feedback method", Soviet Physics Ispekhi, vol. 20, No. 9, pp. 736-745.
Artsimovich, L.A., "Controlled Thermonuclear Reactions", Gordon and Breach Science Publishers, New York (English Edition first Published 1964), pp. 1-9.
Avanzini et al., "Feasibility of Fusion Power Generation by Accelerated Ion Beams," ICENES, pp. 305-309, Jun. 30-Jul. 4, 1986.
Becker et al., "Low-Energy Cross Sections for .sup.11B(p,2.alpha.)*," Atomic Nuclei 327, pp. 341-355, (1987).
Binderbauer et al., Turbulent transport in magnetic confinement: how to avoid it, Dept. of Physics, University of California, Irvine, CA (Apr. 8, 1996), pp. 1-15.
Bohm, D., "Quantum Theory", Dover Publications, Inc., New York (copyright 1951) (ISBN 0-486-65969-0), Ch. 12, pp. 277-283.
Bystritskii et al., "Generation and Transport of Low-Energy Intense Ion Beam", IEEE Transaction on Plasma Science, vol. 32, No. 5, pp. 1986-1992 (Oct. 2004).
Carlson (dated Aug. 1998) "Annotated Bibliography of p-B11 Fusion," online available: http://www.ipp.mpg.de/.about.Arthur.carlson/p-B11-bib.html.
Carlson (dated Jan. 4, 1997) "Fundamental Limitation on Plasma Fusion Systems no in Thermodynamic Equilibrium," Online available: http://www.ipp.mpg.de/.about.Arthur.Carlson/rider.html.
Carlson (dated May 10, 2000), "Home Page of Dr. A. Carlson" online available: http://www/rzg.mpg.de/.about.awc/home.html.
Carlson (dated Sep. 14, 2000), "Re: Lithium Fission—Why Not?", online available: http://groups.google.com/groups?q=rostok...v35u.fsi%40suawc.aug.ipp-garch-ing.mpg.de.
Carlson, (dated Nov. 28, 1997) "Re: Boron/Proton Colliding Beam Fusion Reactor?" online available: http://groups.google.com/groups?q=rostok...opuo.fsf%40s4awc.aug.ipp-garch-ing.mpg.de.
Chao, Alexander Wu et al., Handbook of Accelerator Physics and Engineering (2nd Printing), World Scientific (1998), Chapter 2, pp. 53, 119-120.
Cox, et al., "Thermonuclear Reaction Listing with Cross-Section Data for Four Advanced Reactions," Fusion Technology, vol. 18, pp. 325-339, Sep. 1990.
Davis et al., "Generation of Field-Reversing E Layers with Millisecond Lifetimes," Phys. Review Let., vol. 37, No. 9, pp. 542-545, Aug. 30, 1976.
Dawson, John M., "Alternate Concepts in Controlled Fusion," EPRI ER-429-SR Special Report, Part C: CTR Using the p-.sup.11B Reaction, pp. iii-30, May 1977.
Dawson, John M., Advanced Fuels for CTR, Four Workshops in Alternate Concepts in Controlled Fusion, Electric Power Research Institute, Palo Alto, CA (May 1977), pp. 143-147.
Dobrott, D., "Alternate Fuels in Fusion Reactors," Nuclear Technology/Fusion, pp. 339-347, vol. 4, Sep. 1983.
Dolan, "Fusion Research", vol. II, pp. 277-309, Pergamon Press, NY (1982).
Feldbacher et al., "Basic Cross Section Data for Aneutronc Reactor," Nucl. Inst. and Methods in Phys. Res., A271, pp. 55-64, (1988).

Finn et al., "Field-Reversed Configurations with a Component of Energetic Particles," Nuclear Fusion, vol. 22, pp. 1443-1458, No. 11, (1982).
Goldston et al, Science vol. 278, No. 5346, pp. 2031-2037 (Dec 19, 1997).
Heidbrink et al., "Comparison of Experimental and Theoretical Fast Ion Slowing-Down Times in DIII-D," Nuclear Fusion, vol. 28, No. 10, pp. 1897-1900, plus letters page, (1988).
Heidbrink et al., "The diffusion of fast ions in Ohmic TFTR discharges," Phys. Fluids B, vol. 3, No. 11, pp. 3167-3170, Nov. 1991.
Heidbrink, W.W., "Measurements of classical deceleration of beam ions in the DIII-D tokamak," Phys. Fluids B, vol. 2, No. 1, pp. 4-5, Jan. 1990.
Heidbrink, W.W., et al. "The Behaviour of Fast Ions in Tokamak Experiments," Nuclear Fusion, vol. 34, No. 4 (1994).
Iwanenko et al., "On the Maximal Energy Attainable in a Betatron", Physical Review, vol. 65, No. 11 and 12, Jun. 1 and 15, 1944, p. 343.
Jeffries, C.D., "A Direct Determination of the Magnetic Moment of the Protons in Units of the Nuclera Magnetron", Physical Review, vol. 81, No. 6, Mar. 15, 1951, pp. 1040-1055, plus Figure 8 (one page).
Kalinowsky, H., "Deceleration of Antiprbtons from MeV to keV Energies" Antihydrogen Workshop, Munich, Germany, Jul. 30-31, 1992, vol. 79, No. 1-4, pp. 73-80.
Lampe et al., "Comments on the Colliding Beam Fusion reactor Proposed by Rostoker et al. for Use with the p-11B Fusion Reaction", Naval Research Lab., Plasma Physics Div. (Oct. 30, 1998), title page, pp. i, iii, pp. 1-37. "A White Paper in FRC Development", Apr. 1998, from http:/depts.washington.edu/ppl/programs/wpr98.pdf, pp. 1-26.
Laval Nozzle, wvvw.answers.com/topic/de-laval-nozzle, 2008.
Lawson, J.D., Proc. Soc. B70, pp. 6-10 (1957).
Letters, ISSN 0036-8075, Science, vol. 278, pp. 2024, 2032-2034, No. 5346, Dec. 19, 1997.
Miley et al., "A Possible Route to Small, Flexible Fusion Units,"Energy, vol. 4, pp. 163-170, Special Issue: 1978 Midwest Energy Conference.
Miley, G.H. et al., "On Design and Development issues for the FRC and Related Alternate Confinement Concepts," 6th IAEA Technical committee Meeting and Workshop on Fusion Power Plant Design and Technology, Culham, UK, Mar. 24-27, 1998, vol. 48, No. 3-4, pp. 327-337.
Naitou et al., "Kinetic Effects on the Connective Plasma Diffusion and the Heat Transport," J. of the Phys. Soc. of Jap., vol. 46, No. 1, pp. 258-264, (1979).
Nevins, Carlson and Rostoker, Binderbauer and Monkhorst, Science, vol. 281, No. 5375, p. 307 (1998).
Nevins, et al. "Feasibility of a Colliding Beam Fusion Reactor," online available: wysiwyg://66/http://intl.sciencemag.org/cgi/content/full/281/5375/307a , Jun. 1998.
Phelps, et al., "Observations of the stable equilibrium and classical diffusion of field reversing relativistic electron coils," The Phys. of Fluids, vol. 17, No. 12, pp. 2226-2235, Dec. 1974.
Post, Richard F., "Nuclear Fusion," McGraw-Hill Encyclopedia of Science & Technology, 6.sup.th Ed., pp. 142-153, 12 NIO-OZO, 1981.
Rider, Todd H., "A general critique of inertial-electrostatic confinement fusion systems," Phys. Plasmas, vol. 2, No. 6, Pt. 1, pp. 1853-1870, Jun. 1995.
Rider, Todd H., "Fundamental limitations on plasma fusion systems not in thermodynamic equilibrium," Phys, Plasmas 4 (4), pp. 1039-1046, Apr. 1997.
Robinson, "Army Pushes New Weapon Effort", Aviation Week & Space Technology, Oct. 16, 1978, pp. 42-53.
Rosenbluth et al., "Fokker-Planck Equation for an Inverse-Square Force," The Physical Review, vol. 107, No. 1, pp. 1-6, Jul. 1957.
Rostoker et al., "Colliding Beam Fusion Reactor," Science, vol. 278, pp. 1419-1422, Nov. 1997.
Rostoker et al., "Large Orbit Confinement for Aneutronic Systems," Non-Linear and Relativistic Effects in Plasmids, Ed. V. Stefan, Am. Inst. of Phys., New York, pp. 116-135, (1992).
Rostoker et al., "Magnetic Fusion with High Energy Self-Colliding Ion Beams," Phys. Rev. Let., vol. 27, No. 12, pp. 1818-1821 (1993).

(56) References Cited

OTHER PUBLICATIONS

Rostoker et al., Fusion Reactors Based on Colliding Beams in a Field Reversed Configuration Plasma, Comments Plasma Phys. Controlled Fusion (1997), vol. 18, No. 1, No. 1, pp. 11-23.
Rostoker, Large Orbit Magnetic Confinement Systems for Advanced Fusion Fuels, Final Technical Report, U.S. Department of Commerce, National Technical Information Service (Apr. 1, 1990-Feb. 29, 1992).
Rostoker, N. et al., Classical Scattering in a High Beta Self-Collider/FRC, AIP Conference Proceedings 311 (Irvine, CA 1993), Physics of High Energy Particles in Toroidal Systems, American Institute of Physics, New York.
Rostoker, N. et al., Colliding Beam Fusion Reactor, 12th Inter'l. Conference on High-Power Particle Beams, Beans '98, Haifa, Israel (Jun. 7-12, 1998), vol. 1, 8 pages.
Rostoker, N. et al., Colliding Beam Fusion Reactor, American Association for the Advancement of Science (Nov. 21, 1997), vol. 278, pp. 1419-1422.
Rostoker, N. et al., Colliding Beam Fusion Reactor, University of California, Irvine, and University of Florida, Gainesville, FL, pp. 1-26 (1997).
Rostoker, N. et al., Comments on Plasma Phys. Controlled Fusion, Self-Colliding Systems for Aneutronic Fusion, vol. 15, No. 2, pp. 105-120, 1992 Gordon and Breach, Science Publishers S.A., U.K.
Rostoker, N. et al., Self-colliding beams as an alternative fusion system for D-He/sup 3/reactors, Current trends in International fusion research. Proceedings of the first International Symposium of Evaluation of Current Trends in Fusion Research, Washington, D.C., Nov. 14-18, 1997, pp. 33-41.
Rostoker, N. et al., Self-colliding beams as an alternative fusion system, Proceedings of the International Conference on High Power Particle Beams (10th), San Diego, CA (Jun. 20-24, 1994), pp. 195-201.
Rostoker, Norman, Advanced Fusion Energy and Future Energy Mix Scenarios, Abstracts with Programs from 1999 Annual Meeting and Exposition, The Geological Society of America (Oct. 25-28, 1999), Denver, CO).
Rostoker, Norman, Alternate Fusion Concepts, Current Trends in International Fusion Research, edited by Panarella, Plenum Press, New York and London, pp. 489-495 (1997).
Ruggiero, Alessandro G., Proton-Boron Colliding Beams for Nuclear Fusion, Proceedings if ICONE 8 8th Int'l. Conference on Nuclear Engineering (Apr. 2-6, 2000, Baltimore, MD), pp. 1-11.
Shishlov, A V. et al., "Long time implosion experiments with double gas puffs", Physics of Plasmas, vol. 7, No. 4, pp. 1252-1262 (Apr. 2000).
Song et al., "Electron trapping and acceleration in a modified elongated betatron," Phys. Fluids B, vol. 4, No. 11, pp. 3771-3780, Nov. 1992.
Speth, "RF Source Overview", CCNB Padua, pp. 1-29 (Jun. 5-6, 2003).
Steinhauer, L.C., et al. "FRC 2001: A White Paper on FRC Development in the Next Five Years," Fusion Technology vol. 30, Sep. 1996.
Summary, Plasma Science, Advancing Knowledge in the National Interest, National Research Council of the National Academies, The National Academies Press, Washington D.C. (May 2007) (www.nap.edu).
Tamdem Energy Corporation Presentation, Dec. 12, 1997.
Tomita et al., "Direct Energy Conversion System for D-3He Fusion", Seventh International Conference on Emerging Nuclear Energy Systems, ICENES '93, 1994, pp. 522-526.
Tusczewski, M., "Field Reversed Configurations," Nuclear Fusion, vol. 28, No. 11, pp. 2033-2092 (1988).
Tuszewski, M., "Status of the Field-Reversed Configuration as an Alternate Confinement Concept", Fusion Technology, vol. 15, (Mar. 1989).
Ware, A. et al., Electrostatic plugging of open-ended magnetic containment systems, Nuclear Fusion, Dec. 1969, Austria, vol. 9, No. 4, pp. 353-361.
Weaver et al., "Exotic CTR Fuels for Direct Conversion—Utilizing Fusion Reactors," UCID-16230, Mar. 16, 1973.
Weaver et al., "Exotic CTR Fuels: Non-Thermal Effects and Laser Fusion Applications," Paper presented at 1973 Annual Meeting of the Amer. Phys. Soc. Div. of Plasma Physics, Philadelphia, PA, Oct. 30, 1973.
Weaver et al., "Fusion Microexplosions, Exotic Fusion Fuels, Direct conversion: Advanced Technology Options for CTR," UCID-16309, Apr. 27, 1973.
Welcome to Colliding Beam Fusion (http://fusion.ps.uci.edu/beam/intro.html) (Copyright 1997), pp. 1-3.
Wessel et al., D-T Beam Fusion Reactor, Journal of Fusion Energy, vol. 17, No. 3 (Sep. 1998), pp. 209-211.
Wessel et al., Colliding Beam Fusion Reactor Space Propulsion System, Space Tech. and Applications International Forum—2000, edited by M.S. El-Genk (2000 American Institute of Physics, pp. 1425-1430.
A White Paper on FRC Development, Apr. 1998, from http:/depts.washington.edu/ppl/programs/wpr98.pdf, pp. 1-26.
Wong et al., "Stability of annular equilibrium of energetic large orbit ion beam," Phys. Fluids B., vol. 3, No. 11, pp. 2973-2966, Nov. 1991.
Zweben et al., "Radial Diffusion Coefficient for Counter-Passing MeV Ions in the TFTR Tokamak," Nuclear Fusion, vol. 13, No. 12, pp. 2219-2245, (1991).

\* cited by examiner

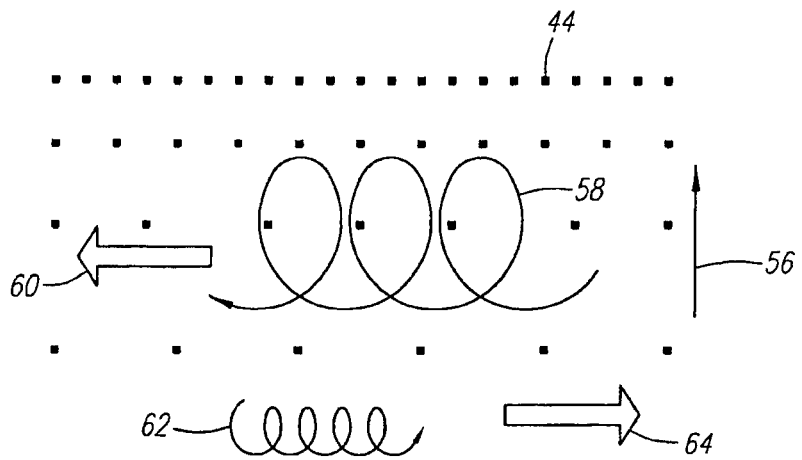
FIG. 4
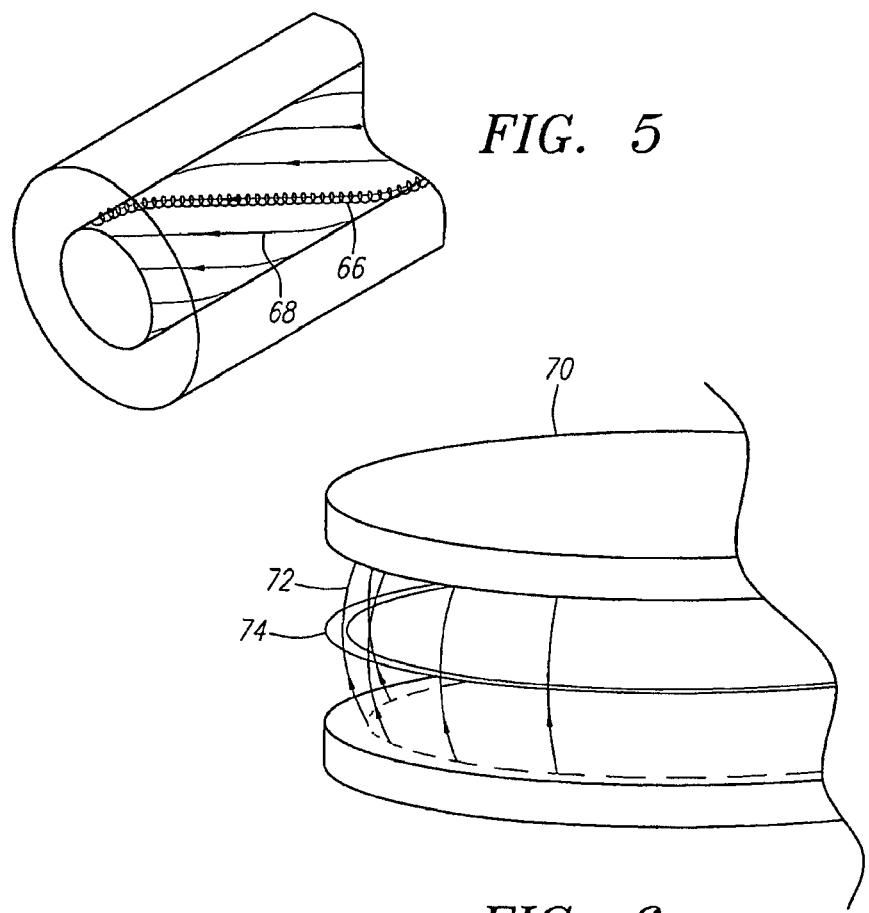
FIG. 5
FIG. 6

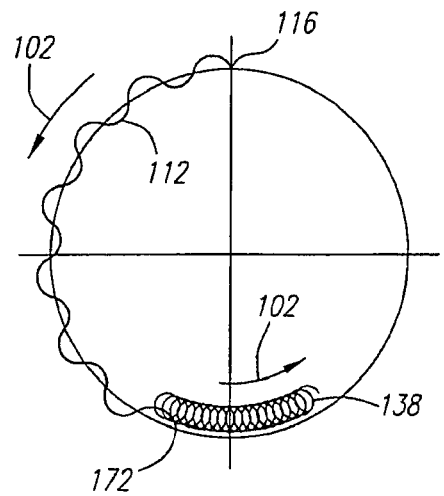
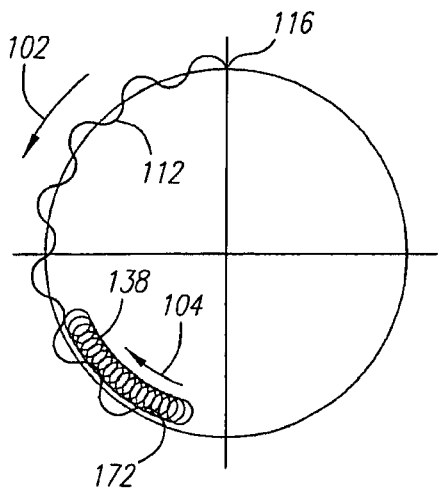
FIG. 18A          FIG. 18B
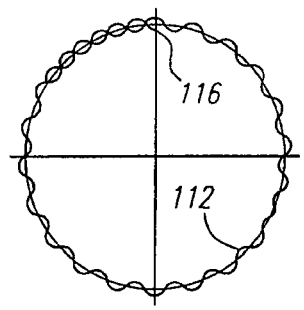
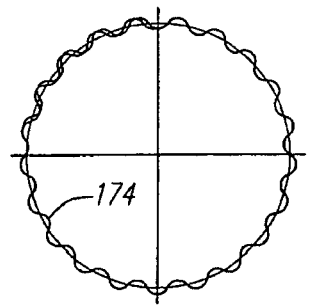
FIG. 19A          FIG. 19B
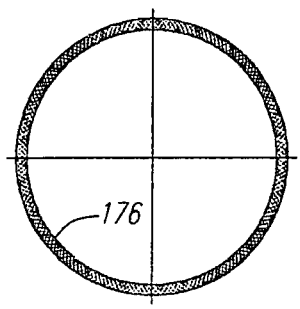
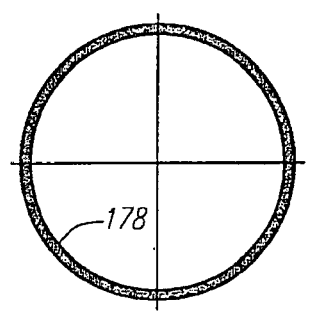
FIG. 19C          FIG. 19D

FORMATION OF A FIELD REVERSED CONFIGURATION FOR MAGNETIC AND ELECTROSTATIC CONFINEMENT OF PLASMA

CROSS-REFERENCE TO RELATED APPLICATIONS

This application is a continuation of U.S. Ser. No. 11/707,282 filed Feb. 16, 2007 now U.S. Pat. No. 7,613,271, which is a continuation of U.S. Ser. No. 11/074,615, filed Mar. 7, 2005 now U.S. Pat. No. 7,477,718, which is a continuation of U.S. Ser. No. 10/328,674, filed Dec. 23, 2002, now U.S. Pat. No. 6,891,911, which is a continuation of U.S. Ser. No. 10/066,424, filed Jan. 31, 2002, now U.S. Pat. No. 6,664,740, which claims the benefit of provisional U.S. application Ser. No. 60/266,074, filed Feb. 1, 2001, and provisional U.S. application Ser. No. 60/297,086, filed on Jun. 8, 2001, which applications are fully incorporated herein by reference.

FIELD OF THE INVENTION

The invention relates generally to the field of plasma physics, and, in particular, to methods and apparati for confining plasma. Plasma confinement is particularly of interest for the purpose of enabling a nuclear fusion reaction.

BACKGROUND OF THE INVENTION

Fusion is the process by which two light nuclei combine to form a heavier one. The fusion process releases a tremendous amount of energy in the form of fast moving particles. Because atomic nuclei are positively charged—due to the protons contained therein—there is a repulsive electrostatic, or Coulomb, force between them. For two nuclei to fuse, this repulsive barrier must be overcome, which occurs when two nuclei are brought close enough together where the short-range nuclear forces become strong enough to overcome the Coulomb force and fuse the nuclei. The energy necessary for the nuclei to overcome the Coulomb barrier is provided by their thermal energies, which must be very high. For example, the fusion rate can be appreciable if the temperature is at least of the order of $10^4$ eV—corresponding roughly to 100 million degrees Kelvin. The rate of a fusion reaction is a function of the temperature, and it is characterized by a quantity called reactivity. The reactivity of a D-T reaction, for example, has a broad peak between 30 keV and 100 keV.

Typical fusion reactions include:

$D+D \rightarrow He^3(0.8\ MeV)+n(2.5\ MeV),$

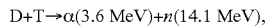

$D+T \rightarrow \alpha(3.6\ MeV)+n(14.1\ MeV),$

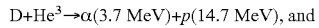

$D+He^3 \rightarrow \alpha(3.7\ MeV)+p(14.7\ MeV),$ and

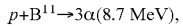

$p+B^{11} \rightarrow 3\alpha(8.7\ MeV),$ where D indicates deuterium, T indicates tritium, $\alpha$ indicates a helium nucleus, n indicates a neutron, p indicates a proton, He indicates helium, and $B^{11}$ indicates Boron-11. The numbers in parentheses in each equation indicate the kinetic energy of the fusion products.

The first two reactions listed above—the D-D and D-T reactions—are neutronic, which means that most of the energy of their fusion products is carried by fast neutrons. The disadvantages of neutronic reactions are that (1) the flux of fast neutrons creates many problems, including structural damage of the reactor walls and high levels of radioactivity for most construction materials; and (2) the energy of fast neutrons is collected by converting their thermal energy to electric energy, which is very inefficient (less than 30%). The advantages of neutronic reactions are that (1) their reactivity peaks at a relatively low temperature; and (2) their losses due to radiation are relatively low because the atomic numbers of deuterium and tritium are 1.

The reactants in the other two equations—$D-He^3$ and $p-B^{11}$—are called advanced fuels. Instead of producing fast neutrons, as in the neutronic reactions, their fusion products are charged particles. One advantage of the advanced fuels is that they create much fewer neutrons and therefore suffer less from the disadvantages associated with them. In the case of $D-He^3$, some fast neutrons are produced by secondary reactions, but these neutrons account for only about 10 percent of the energy of the fusion products. The $p-B^{11}$ reaction is free of fast neutrons, although it does produce some slow neutrons that result from secondary reactions but create much fewer problems. Another advantage of the advanced fuels is that the energy of their fusion products can be collected with a high efficiency, up to 90 percent. In a direct energy conversion process, their charged fusion products can be slowed down and their kinetic energy converted directly to electricity.

The advanced fuels have disadvantages, too. For example, the atomic numbers of the advanced fuels are higher (2 for $He^3$ and 5 for $B^{11}$). Therefore, their radiation losses are greater than in the neutronic reactions. Also, it is much more difficult to cause the advanced fuels to fuse. Their peak reactivities occur at much higher temperatures and do not reach as high as the reactivity for D-T. Causing a fusion reaction with the advanced fuels thus requires that they be brought to a higher energy state where their reactivity is significant. Accordingly, the advanced fuels must be contained for a longer time period wherein they can be brought to appropriate fusion conditions.

The containment time for a plasma is $\Delta t=r^2/D$, where r is a minimum plasma dimension and D is a diffusion coefficient. The classical value of the diffusion coefficient is $D_c=a_i^2/\tau_{ie}$, where $a_i$ is the ion gyroradius and $\tau_{ie}$ is the ion-electron collision time. Diffusion according to the classical diffusion coefficient is called classical transport. The Bohm diffusion coefficient, attributed to short-wavelength instabilities, is $D_B=(1/16)a_i^2\Omega_i$, where $\Omega_i$ is the ion gyrofrequency. Diffusion according to this relationship is called anomalous transport. For fusion conditions, $D_B/D_c=(1/16)\Omega_i\tau_{ie}\cong 10^8$, anomalous transport results in a much shorter containment time than does classical transport. This relation determines how large a plasma must be in a fusion reactor, by the requirement that the containment time for a given amount of plasma must be longer than the time for the plasma to have a nuclear fusion reaction. Therefore, classical transport condition is more desirable in a fusion reactor, allowing for smaller initial plasmas.

In early experiments with toroidal confinement of plasma, a containment time of $\Delta t \cong r^2/D_B$ was observed. Progress in the last 40 years has increased the containment time to $\Delta t \cong 1000\ r^2/D_B$. One existing fusion reactor concept is the Tokamak. The magnetic field of a Tokamak 68 and a typical particle orbit 66 are illustrated in FIG. 5. For the past 30 years, fusion efforts have been focussed on the Tokamak reactor using a D-T fuel. These efforts have culminated in the International Thermonuclear Experimental Reactor (ITER), illustrated in FIG. 7. Recent experiments with Tokamaks suggest that classical transport, $\Delta t \cong r^2/D_c$, is possible, in which case the minimum plasma dimension can be reduced from meters to centimeters. These experiments involved the injection of energetic beams (50 to 100 keV), to heat the plasma to temperatures of 10 to 30 keV. See W. Heidbrink & G. J. Sadler, 34

*Nuclear Fusion* 535 (1994). The energetic beam ions in these experiments were observed to slow down and diffuse classically while the thermal plasma continued to diffuse anomalously fast. The reason for this is that the energetic beam ions have a large gyroradius and, as such, are insensitive to fluctuations with wavelengths shorter than the ion gyroradius ($\lambda < a_i$). The short-wavelength fluctuations tend to average over a cycle and thus cancel. Electrons, however, have a much smaller gyroradius, so they respond to the fluctuations and transport anomalously.

Because of anomalous transport, the minimum dimension of the plasma must be at least 2.8 meters. Due to this dimension, the ITER was created 30 meters high and 30 meters in diameter. This is the smallest D-T Tokamak-type reactor that is feasible. For advanced fuels, such as D-$He^3$ and p-$B^{11}$, the Tokamak-type reactor would have to be much larger because the time for a fuel ion to have a nuclear reaction is much longer. A Tokamak reactor using D-T fuel has the additional problem that most of the energy of the fusion products energy is carried by 14 MeV neutrons, which cause radiation damage and induce reactivity in almost all construction materials due to the neutron flux. In addition, the conversion of their energy into electricity must be by a thermal process, which is not more than 30% efficient.

Another proposed reactor configuration is a colliding beam reactor. In a colliding beam reactor, a background plasma is bombarded by beams of ions. The beams comprise ions with an energy that is much larger than the thermal plasma. Producing useful fusion reactions in this type of reactor has been infeasible because the background plasma slows down the ion beams. Various proposals have been made to reduce this problem and maximize the number of nuclear reactions.

For example, U.S. Pat. No. 4,065,351 to Jassby et al. discloses a method of producing counterstreaming colliding beams of deuterons and tritons in a toroidal confinement system. In U.S. Pat. No. 4,057,462 to Jassby et al., electromagnetic energy is injected to counteract the effects of bulk equilibrium plasma drag on one of the ion species. The toroidal confinement system is identified as a Tokamak. In U.S. Pat. No. 4,894,199 to Rostoker, beams of deuterium and tritium are injected and trapped with the same average velocity in a Tokamak, mirror, or field reversed configuration. There is a low density cool background plasma for the sole purpose of trapping the beams. The beams react because they have a high temperature, and slowing down is mainly caused by electrons that accompany the injected ions. The electrons are heated by the ions in which case the slowing down is minimal.

In none of these devices, however, does an equilibrium electric field play any part. Further, there is no attempt to reduce, or even consider, anomalous transport.

Other patents consider electrostatic confinement of ions and, in some cases, magnetic confinement of electrons. These include U.S. Pat. No. 3,258,402 to Farnsworth and U.S. Pat. No. 3,386,883 to Farnsworth, which disclose electrostatic confinement of ions and inertial confinement of electrons; U.S. Pat. No. 3,530,036 to Hirsch et al. and U.S. Pat. No. 3,530,497 to Hirsch et al. are similar to Farnsworth; U.S. Pat. No. 4,233,537 to Limpaecher, which discloses electrostatic confinement of ions and magnetic confinement of electrons with multipole cusp reflecting walls; and U.S. Pat. No. 4,826,646 to Bussard, which is similar to Limpaecher and involves point cusps. None of these patents consider electrostatic confinement of electrons and magnetic confinement of ions. Although there have been many research projects on electrostatic confinement of ions, none of them have succeeded in establishing the required electrostatic fields when the ions have the required density for a fusion reactor. Lastly, none of the patents cited above discuss a field reversed configuration magnetic topology.

The field reversed configuration (FRC) was discovered accidentally around 1960 at the Naval Research Laboratory during theta pinch experiments. A typical FRC topology, wherein the internal magnetic field reverses direction, is illustrated in FIG. 8 and FIG. 10, and particle orbits in a FRC are shown in FIG. 11 and FIG. 14. Regarding the FRC, many research programs have been supported in the United States and Japan. There is a comprehensive review paper on the theory and experiments of FRC research from 1960-1988. See M. Tuszewski, 28 *Nuclear Fusion* 2033, (1988). A white paper on FRC development describes the research in 1996 and recommendations for future research. See L. C. Steinhauer et al., 30 *Fusion Technology* 116 (1996). To this date, in FRC experiments the FRC has been formed with the theta pinch method. A consequence of this formation method is that the ions and electrons each carry half the current, which results in a negligible electrostatic field in the plasma and no electrostatic confinement. The ions and electrons in these FRCs were contained magnetically. In almost all FRC experiments, anomalous transport has been assumed. See, e.g., Tuszewski, beginning of section 1.5.2, at page 2072.

SUMMARY OF THE INVENTION

To address the problems faced by previous plasma containment systems, a system and apparatus for containing plasma are herein described in which plasma ions are contained magnetically in stable, large orbits and electrons are contained electrostatically in an energy well. A major innovation of the present invention over all previous work with FRCs is the simultaneous electrostatic confinement of electrons and magnetic confinement of ions, which tends to avoid anomalous transport and facilitate classical containment of both electrons and ions. In this configuration, ions may have adequate density and temperature so that upon collisions they are fused together by the nuclear force, thus releasing fusion energy.

In a preferred embodiment, a plasma confinement system comprises a chamber, a magnetic field generator for applying a magnetic field in a direction substantially along a principle axis, and an annular plasma layer that comprises a circulating beam of ions. Ions of the annular plasma beam layer are substantially contained within the chamber magnetically in orbits and the electrons are substantially contained in an electrostatic energy well. In one aspect of one preferred embodiment a magnetic field generator comprises a current coil. Preferably, the system further comprises mirror coils near the ends of the chamber that increase the magnitude of the applied magnetic field at the ends of the chamber. The system may also comprise a beam injector for injecting a neutralized ion beam into the applied magnetic field, wherein the beam enters an orbit due to the force caused by the applied magnetic field. In another aspect of the preferred embodiments, the system forms a magnetic field having a topology of a field reversed configuration.

Also disclosed is a method of confining plasma comprising the steps of magnetically confining the ions in orbits within a magnetic field and electrostatically confining the electrons in an energy well. An applied magnetic field may be tuned to produce and control the electrostatic field. In one aspect of the method the field is tuned so that the average electron velocity is approximately zero. In another aspect, the field is tuned so that the average electron velocity is in the same direction as the average ion velocity. In another aspect of the method, the method forms a field reversed configuration magnetic field, in which the plasma is confined.

In another aspect of the preferred embodiments, an annular plasma layer is contained within a field reversed configuration magnetic field. The plasma layer comprises positively charged ions, wherein substantially all of the ions are non-adiabatic, and electrons contained within an electrostatic energy well. The plasma layer is caused to rotate and form a magnetic self-field of sufficient magnitude to cause field reversal.

In other aspects of the preferred embodiments, the plasma may comprise at least two different ion species, one or both of which may comprise advanced fuels.

Having a non-adiabatic plasma of energetic, large-orbit ions tends to prevent the anomalous transport of ions. This can be done in a FRC, because the magnetic field vanishes (i.e., is zero) over a surface within the plasma. Ions having a large orbit tend to be insensitive to short-wavelength fluctuations that cause anomalous transport.

Magnetic confinement is ineffective for electrons because they have a small gyroradius—due to their small mass—and are therefore sensitive to short-wavelength fluctuations that cause anomalous transport. Therefore, the electrons are effectively confined in a deep potential well by an electrostatic field, which tends to prevent the anomalous transport of energy by electrons. The electrons that escape confinement must travel from the high density region near the null surface to the surface of the plasma. In so doing, most of their energy is spent in ascending the energy well. When electrons reach the plasma surface and leave with fusion product ions, they have little energy left to transport. The strong electrostatic field also tends to make all the ion drift orbits rotate in the diamagnetic direction, so that they are contained. The electrostatic field further provides a cooling mechanism for electrons, which reduces their radiation losses.

The increased containment ability allows for the use of advanced fuels such as D-He$^3$ and p-B$^{11}$, as well as neutronic reactants such as D-D and D-T. In the D-He$^3$ reaction, fast neutrons are produced by secondary reactions, but are an improvement over the D-T reaction. The p-B$^{11}$ reaction, and the like, is preferable because it avoids the problems of fast neutrons completely.

Another advantage of the advanced fuels is the direct energy conversion of energy from the fusion reaction because the fusion products are moving charged particles, which create an electrical current. This is a significant improvement over Tokamaks, for example, where a thermal conversion process is used to convert the kinetic energy of fast neutrons into electricity. The efficiency of a thermal conversion process is lower than 30%, whereas the efficiency of direct energy conversion can be as high as 90%.

Other aspects and features of the present invention will become apparent from consideration of the following description taken in conjunction with the accompanying drawings.

BRIEF DESCRIPTION OF THE DRAWINGS

Preferred embodiments are illustrated by way of example, and not by way of limitation, in the figures of the accompanying drawings, in which like reference numerals refer to like components.

FIG. 4 shows the gradient drift.

FIG. 5 shows an adiabatic particle orbit in a Tokamak.

FIG. 6 shows a non-adiabatic particle orbit in a betatron.

FIGS. 18A and 18B show transitions from betatron orbits to drift orbits due to large-angle, ion-ion collisions.

FIG. 19 show A, B, C and D betatron orbits when small-angle, electron-ion collisions are considered.

DETAILED DESCRIPTION OF THE PREFERRED EMBODIMENTS

An ideal fusion reactor solves the problem of anomalous transport for both ions and electrons. The anomalous transport of ions is avoided by magnetic confinement in a field reversed configuration (FRC) in such a way that the majority of the ions have large, non-adiabatic orbits, making them insensitive to short-wavelength fluctuations that cause anomalous transport of adiabatic ions. For electrons, the anomalous transport of energy is avoided by tuning the externally applied magnetic field to develop a strong electric field, which confines them electrostatically in a deep potential well. Moreover, the fusion fuel plasmas that can be used with the present confinement process and apparatus are not limited to neutronic fuels only, but also advantageously include advanced fuels. (For a discussion of advanced fuels, see R.

Feldbacher & M. Heindler, *Nuclear Instruments and Methods in Physics Research*, A271 (1988)JJ-64 (North Holland Amsterdam).)

The solution to the problem of anomalous transport found herein makes use of a specific magnetic field configuration, which is the FRC. In particular, the existence of a region in a FRC where the magnetic field vanishes makes it possible to have a plasma comprising a majority of non-adiabatic ions.

Background Theory

Before describing the system and apparatus in detail, it will be helpful to first review a few key concepts necessary to understand the concepts contained herein.

Lorentz Force and Particle Orbits in a Magnetic Field

A particle with electric charge q moving with velocity $\vec{v}$ in a magnetic field $\vec{B}$ experiences a force $\vec{F}_L$ given by $$\vec{F}_L = q\frac{\vec{v} \times \vec{B}}{c}. \quad (1)$$

Figure 1A:
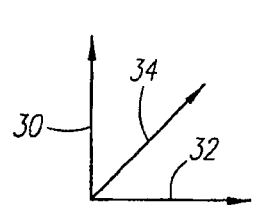
FIGS. 1A and 1B show, respectively, the Lorentz force acting on a positive and a negative charge.
Figure 1B:
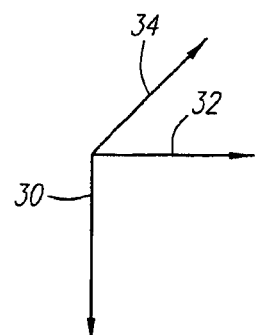

The force $\vec{F}_L$ is called the Lorentz force. It, as well as all the formulas used in the present discussion, is given in the gaussian system of units. The direction of the Lorentz force depends on the sign of the electric charge q. The force is perpendicular to both velocity and magnetic field. FIG. 1A shows the Lorentz force 30 acting on a positive charge. The velocity of the particle is shown by the vector 32. The magnetic field is 34. Similarly, FIG. 1B shows the Lorentz force 30 acting on a negative charge.

As explained, the Lorentz force is perpendicular to the velocity of a particle; thus, a magnetic field is unable to exert force in the direction of the particle's velocity. It follows from Newton's second law, $\vec{F} = m\vec{a}$, that a magnetic field is unable to accelerate a particle in the direction of its velocity. A magnetic field can only bend the orbit of a particle, but the magnitude of its velocity is not affected by a magnetic field.

Figure 2A:
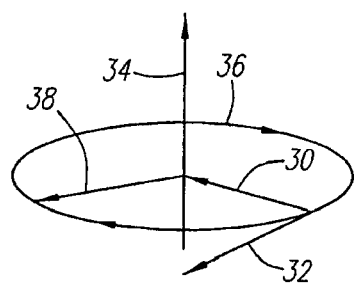
FIGS. 2A and 2B show Larmor orbits of charged particles in a constant magnetic field.

FIG. 2A shows the orbit of a positively charged particle in a constant magnetic field 34. The Lorentz force 30 in this case is constant in magnitude, and the orbit 36 of the particle forms a circle. This circular orbit 36 is called a Larmor orbit. The radius of the circular orbit 36 is called a gyroradius 38.

Figure 2B:
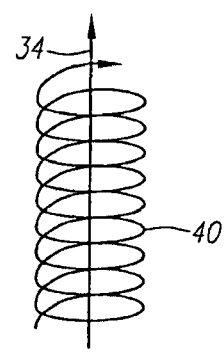

Usually, the velocity of a particle has a component that is parallel to the magnetic field and a component that is perpendicular to the field. In such a case, the particle undergoes two simultaneous motions: a rotation around the magnetic field line and a translation along it. The combination of these two motions creates a helix that follows the magnetic field line 40. This is indicated in FIG. 2B.

A particle in its Larmor orbit revolves around a magnetic field line. The number of radians traveled per unit time is the particle's gyrofrequency, which is denoted by Ω and given by $$\Omega = \frac{qB}{mc}, \quad (2)$$

where m is the mass of the particle and c is the speed of light. The gyroradius $a_L$ of a charged particle is given by $$a_L = \frac{v_\perp}{\Omega}, \quad (3)$$

where $v_\perp$ is the component of the velocity of the particle perpendicular to the magnetic field.

$\vec{E} \times \vec{B}$ Drift and Gradient Drift

Figure 3:
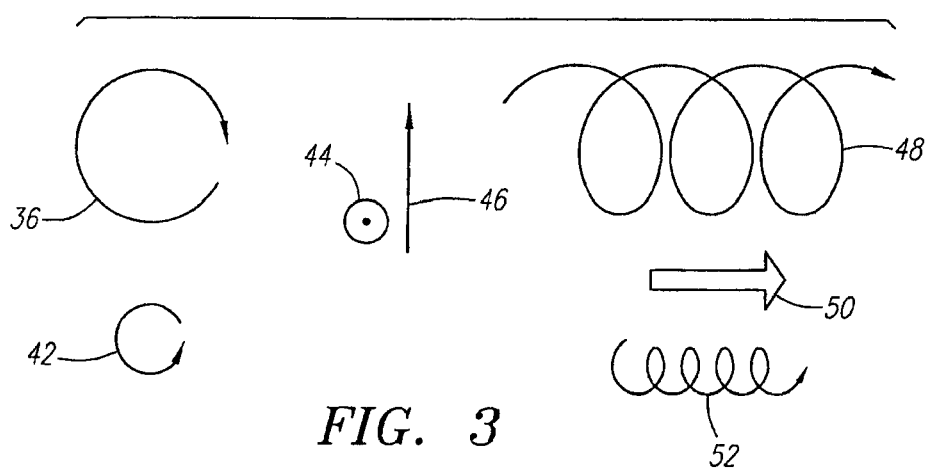
FIG. 3 shows the $\vec{E} \times \vec{B}$ drift.
Figure 7:
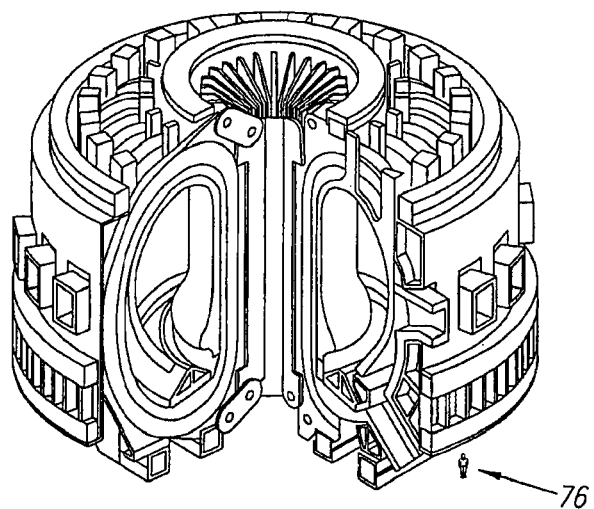
FIG. 7 shows the International Thermonuclear Experimental Reactor (ITER).

Electric fields affect the orbits of charged particles, as shown in FIG. 3. In FIG. 3, the magnetic field 44 points toward the reader. The orbit of a positively charged ion due to the magnetic field 44 alone would be a circle 36; the same is true for an electron 42. In the presence of an electric field 46, however, when the ion moves in the direction of the electric field 46, its velocity increases. As can be appreciated, the ion is accelerated by the force $q\vec{E}$. It can further be seen that, according to Eq. 3, the ion's gyroradius will increase as its velocity does.

As the ion is accelerated by the electric field 46, the magnetic field 44 bends the ion's orbit. At a certain point the ion reverses direction and begins to move in a direction opposite to the electric field 46. When this happens, the ion is decelerated, and its gyroradius therefore decreases. The ion's gyroradius thus increases and decreases in alternation, which gives rise to a sideways drift of the ion orbit 48 in the direction 50 as shown in FIG. 3. This motion is called $\vec{E} \times \vec{B}$ drift. Similarly, electron orbits 52 drift in the same direction 50.

A similar drift can be caused by a gradient of the magnetic field 44 as illustrated in FIG. 4. In FIG. 4, the magnetic field 44 points towards the reader. The gradient of the magnetic field is in the direction 56. The increase of the magnetic field's strength is depicted by the denser amount of dots in the figure.

From Eqs. 2 and 3, it follows that the gyroradius is inversely proportional to the strength of the magnetic field. When an ion moves in the direction of increasing magnetic field its gyroradius will decrease, because the Lorentz force increases, and vice versa. The ion's gyroradius thus decreases and increases in alternation, which gives rise to a sideways drift of the ion orbit 58 in the direction 60. This motion is called gradient drift. Electron orbits 62 drift in the opposite direction 64.

Adiabatic and Non-Adiabatic Particles

Most plasma comprises adiabatic particles. An adiabatic particle tightly follows the magnetic field lines and has a small gyroradius. FIG. 5 shows a particle orbit 66 of an adiabatic particle that follows tightly a magnetic field line 68. The magnetic field lines 68 depicted are those of a Tokamak.

A non-adiabatic particle has a large gyroradius. It does not follow the magnetic field lines and is usually energetic. There exist other plasmas that comprise non-adiabatic particles. FIG. 6 illustrates a non-adiabatic plasma for the case of a betatron. The pole pieces 70 generate a magnetic field 72. As FIG. 6 illustrates, the particle orbits 74 do not follow the magnetic field lines 72.

Radiation in Plasmas

A moving charged particle radiates electromagnetic waves. The power radiated by the particle is proportional to the square of the charge. The charge of an ion is Ze, where e is the electron charge and Z is the atomic number. Therefore, for each ion there will be Z free electrons that will radiate. The total power radiated by these Z electrons is proportional to the cube of the atomic number ($Z^3$).

Charged Particles in a FRC

Figure 8:
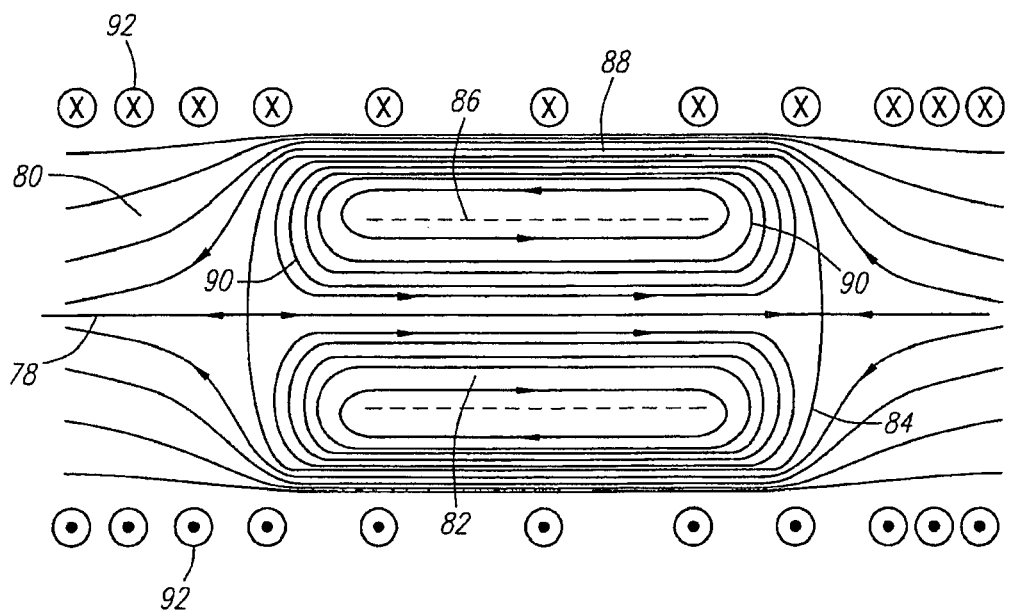
FIG. 8 shows the magnetic field of a FRC.

FIG. 8 shows the magnetic field of a FRC. The system has cylindrical symmetry with respect to its axis 78. In the FRC, there are two regions of magnetic field lines: open 80 and closed 82. The surface dividing the two regions is called the separatrix 84. The FRC forms a cylindrical null surface 86 in which the magnetic field vanishes. In the central part 88 of the FRC the magnetic field does not change appreciably in the axial direction. At the ends 90, the magnetic field does change appreciably in the axial direction. The magnetic field along the center axis 78 reverses direction in the FRC, which gives rise to the term "Reversed" in Field Reversed Configuration (FRC).

Figure 9A:
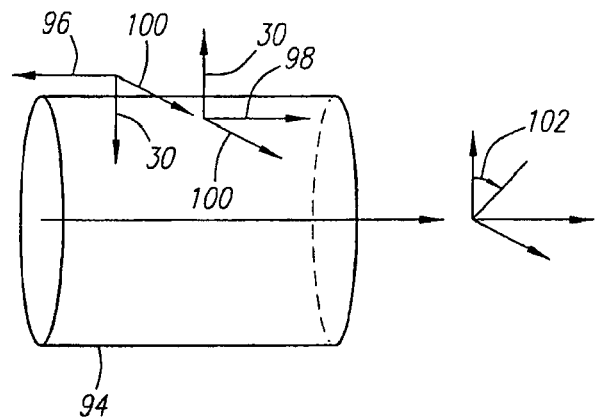
FIGS. 9A and 9B show, respectively, the diamagnetic and the counterdiamagnetic direction in a FRC.

In FIG. 9A, the magnetic field outside of the null surface 94 is in the direction 96. The magnetic field inside the null surface is in the direction 98. If an ion moves in the direction 100, the Lorentz force 30 acting on it points towards the null surface 94. This is easily appreciated by applying the right-hand rule. For particles moving in the direction 102, called diamagnetic, the Lorentz force always points toward the null surface 94. This phenomenon gives rise to a particle orbit called betatron orbit, to be described below.

Figure 9B:
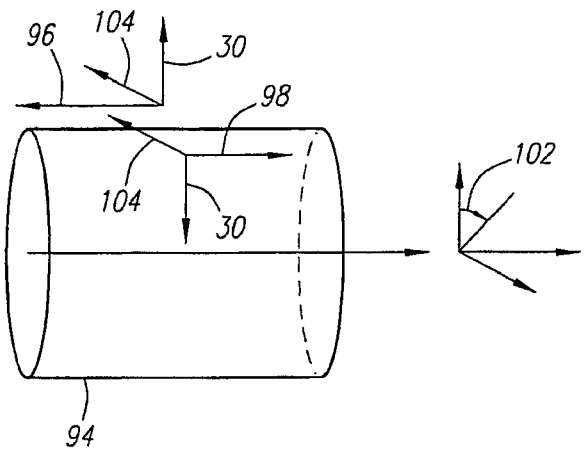

FIG. 9B shows an ion moving in the direction 104, called counterdiamagnetic. The Lorentz force in this case points away from the null surface 94. This phenomenon gives rise to a type of orbit called a drift orbit, to be described below. The diamagnetic direction for ions is counterdiamagnetic for electrons, and vice versa.

Figure 10:
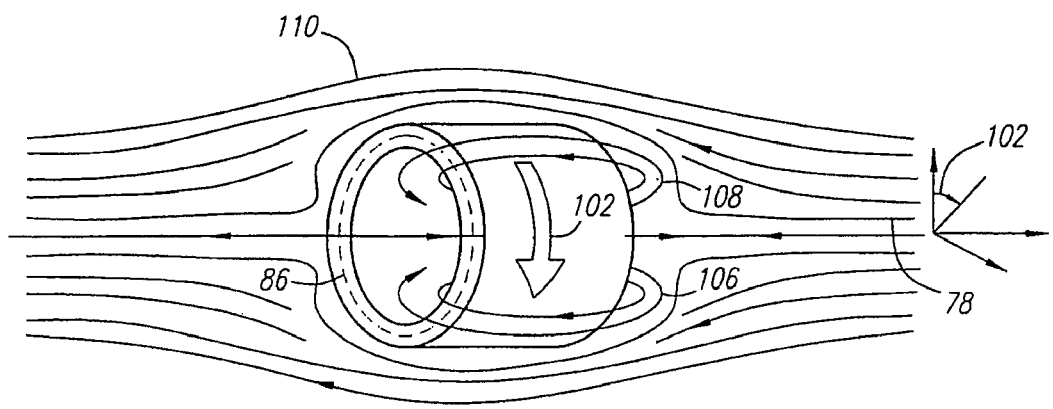
FIG. 10 shows the colliding beam system.

FIG. 10 shows a ring or annular layer of plasma 106 rotating in the ions' diamagnetic direction 102. The ring 106 is located around the null surface 86. The magnetic field 108 created by the annular plasma layer 106, in combination with an externally applied magnetic field 110, forms a magnetic field having the topology of a FRC (The topology is shown in FIG. 8).

The ion beam that forms the plasma layer 106 has a temperature; therefore, the velocities of the ions form a Maxwell distribution in a frame rotating at the average angular velocity of the ion beam. Collisions between ions of different velocities lead to fusion reactions. For this reason, the plasma beam layer 106 is called a colliding beam system.

Figure 11:
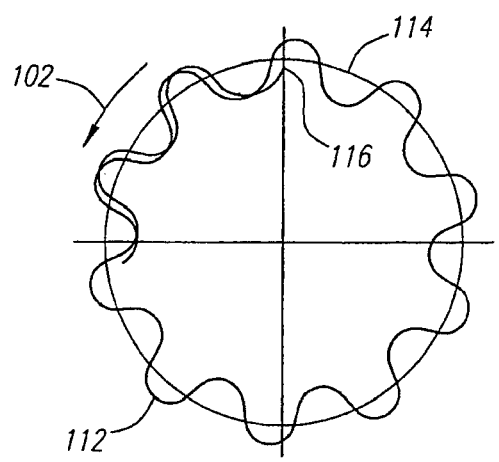
FIG. 11 shows a betatron orbit.

FIG. 11 shows the main type of ion orbits in a colliding beam system, called a betatron orbit 112. A betatron orbit 112 can be expressed as a sine wave centered on the null circle 114. As explained above, the magnetic field on the null circle 114 vanishes. The plane of the orbit 112 is perpendicular to the axis 78 of the FRC. Ions in this orbit 112 move in their diamagnetic direction 102 from a starting point 116. An ion in a betatron orbit has two motions: an oscillation in the radial direction (perpendicular to the null circle 114), and a translation along the null circle 114.

Figure 12A:
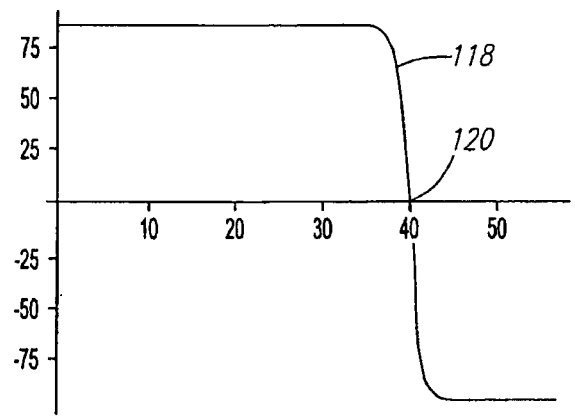
FIGS. 12A and 12B show, respectively, the magnetic field and the direction of the gradient drift in a FRC.

FIG. 12A is a graph of the magnetic field 118 in a FRC. The field 118 is derived using a one-dimensional equilibrium model, to be discussed below in conjunction with the theory of the invention. The horizontal axis of the graph represents the distance in centimeters from the FRC axis 78. The magnetic field is in kilogauss. As the graph depicts, the magnetic field 118 vanishes at the null circle radius 120.

Figure 12B:
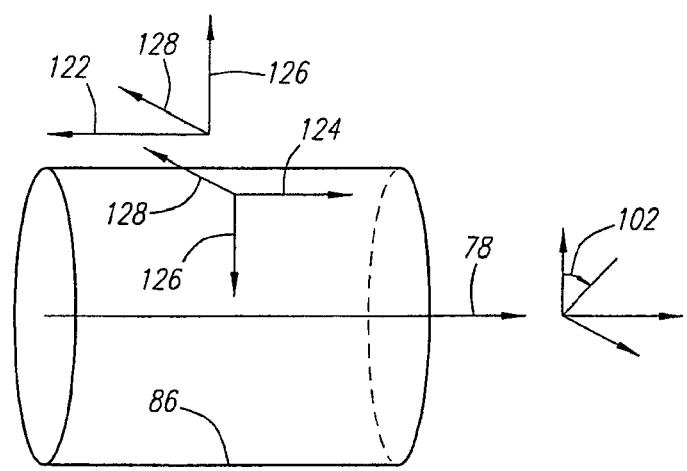

As shown in FIG. 12B, a particle moving near the null circle will see a gradient 126 of the magnetic field pointing away from the null surface 86. The magnetic field outside the null circle is 122, while the magnetic field inside the null circle is 124. The direction of the gradient drift is given by the cross product $\vec{B} \times \nabla B$, where $\nabla B$ is the gradient of the magnetic field; thus, it can be appreciated by applying the right-hand rule that the direction of the gradient drift is in the counterdiamagnetic direction, whether the ion is outside or inside the null circle 128.

Figure 13A:
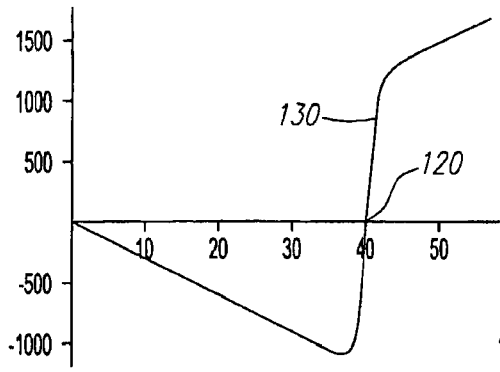
FIGS. 13A and 13B show, respectively, the electric field and the direction of the $\vec{E} \times \vec{B}$ drift in a FRC.

FIG. 13A is a graph of the electric field 130 in a FRC. The field 130 is derived using a one-dimensional equilibrium model, to be discussed below in conjunction with the theory of the invention. The horizontal axis of the graph represents the distance in centimeters from the FRC axis 78. The electric field is in volts/cm. As the graph depicts, the electric field 130 vanishes close to the null circle radius 120.

Figure 13B:
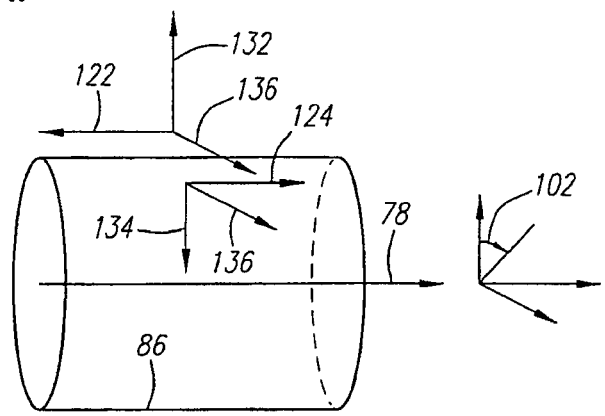

As shown if FIG. 13B, the electric field for ions is deconfining; it points away from the null surface 132,134. The magnetic field, as before, is in the directions 122,124. It can be appreciated by applying the right-hand rule that the direction of the $\vec{E} \times \vec{B}$ drift is in the diamagnetic direction, whether the ion is outside or inside the null surface 136.

Figure 14A:
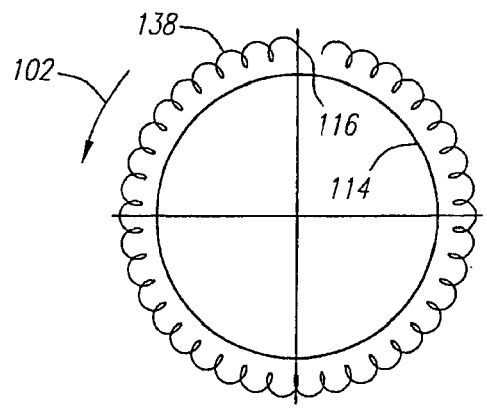
FIGS. 14A, 14B and 14C show ion drift orbits.
Figure 14B:
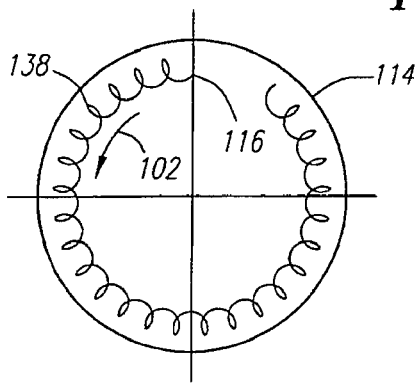

FIGS. 14A and 14B show another type of common orbit in a FRC, called a drift orbit 138. Drift orbits 138 can be outside of the null surface, as shown in FIG. 14A, or inside it, as shown in FIG. 14B. Drift orbits 138 rotate in the diamagnetic direction if the $\vec{E} \times \vec{B}$ drift dominates or in the counterdiamagnetic direction if the gradient drift dominates. The drift orbits 138 shown in FIGS. 14A and 14B rotate in the diamagnetic direction 102 from starting point 116.

Figure 14C:
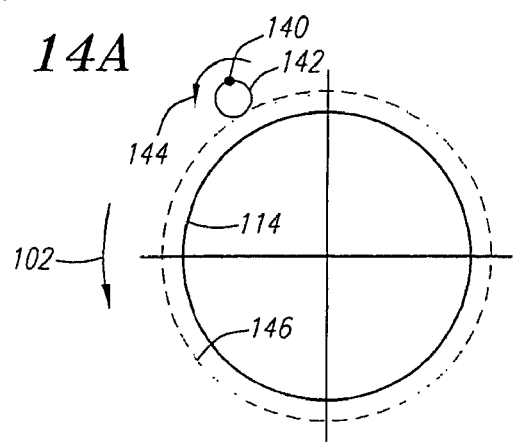

A drift orbit, as shown in FIG. 14C, can be thought of as a small circle rolling over a relatively bigger circle. The small circle 142 spins around its axis in the sense 144. It also rolls over the big circle 146 in the direction 102. The point 140 will trace in space a path similar to 138.

Figure 15A:
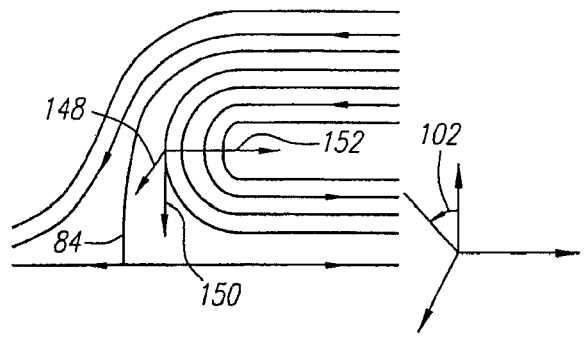
FIGS. 15A and 15B show the Lorentz force at the ends of a FRC.
Figure 15B:
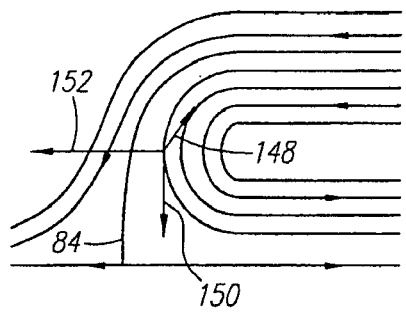

FIGS. 15A and 15B show the direction of the Lorentz force at the ends of a FRC. In FIG. 15A, an ion is shown moving in the diamagnetic direction 102 with a velocity 148 in a magnetic field 150. It can be appreciated by applying the right-hand rule that the Lorentz force 152 tends to push the ion back into the region of closed field lines. In this case, therefore, the Lorentz force 152 is confining for the ions. In FIG. 15B, an ion is shown moving in the counterdiamagnetic direction with a velocity 148 in a magnetic field 150. It can be appreciated by applying the right-hand rule that the Lorentz force 152 tends to push the ion into the region of open field lines. In this case, therefore, the Lorentz force 152 is deconfining for the ions.

Magnetic and Electrostatic Confinement in a FRC

A plasma layer 106 (see FIG. 10) can be formed in a FRC by injecting energetic ion beams around the null surface 86 in the diamagnetic direction 102 of ions. (A detailed discussion of different methods of forming the FRC and plasma ring follows below.) In the circulating plasma layer 106, most of the ions have betatron orbits 112 (see FIG. 11), are energetic, and are non-adiabatic; thus, they are insensitive to short-wavelength fluctuations that cause anomalous transport.

While studying a plasma layer 106 in equilibrium conditions as described above, it was discovered that the conservation of momentum imposes a relation between the angular velocity of ions $\omega_i$ and the angular velocity of electrons $\omega_e$. (The derivation of this relation is given below in conjunction with the theory of the invention.) The relation is $$\omega_e = \omega_i \left[1 - \frac{\omega_i}{\Omega_0}\right], \text{ where } \Omega_0 = \frac{ZeB_0}{m_i c}. \tag{4}$$

In Eq. 4, Z is the ion atomic number, $m_i$ is the ion mass, e is the electron charge, $B_0$ is the magnitude of the applied magnetic field, and c is the speed of light. There are three free parameters in this relation: the applied magnetic field $B_0$, the electron angular velocity $\omega_e$, and the ion angular velocity $\omega_i$. If two of them are known, the third can be determined from Eq. 4.

Because the plasma layer 106 is formed by injecting ion beams into the FRC, the angular velocity of ions $\omega_i$ is determined by the injection kinetic energy of the beam $W_i$, which is given by $$W_i = \frac{1}{2}m_i V_i^2 = \frac{1}{2}m_i(\omega_i r_o)^2.$$

Here, $V_i = \omega_i r_0$, where $V_i$ is the injection velocity of ions, $\omega_i$ is the cyclotron frequency of ions, and $r_0$ is the radius of the null surface 86. The kinetic energy of electrons in the beam has been ignored because the electron mass $m_e$ is much smaller than the ion mass $m_i$.

Figure 16A:
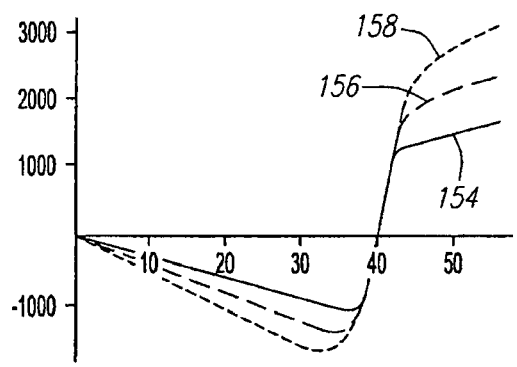
FIGS. 16A and 16B show the tuning of the electric field and the electric potential in the colliding beam system.
Figure 16B:
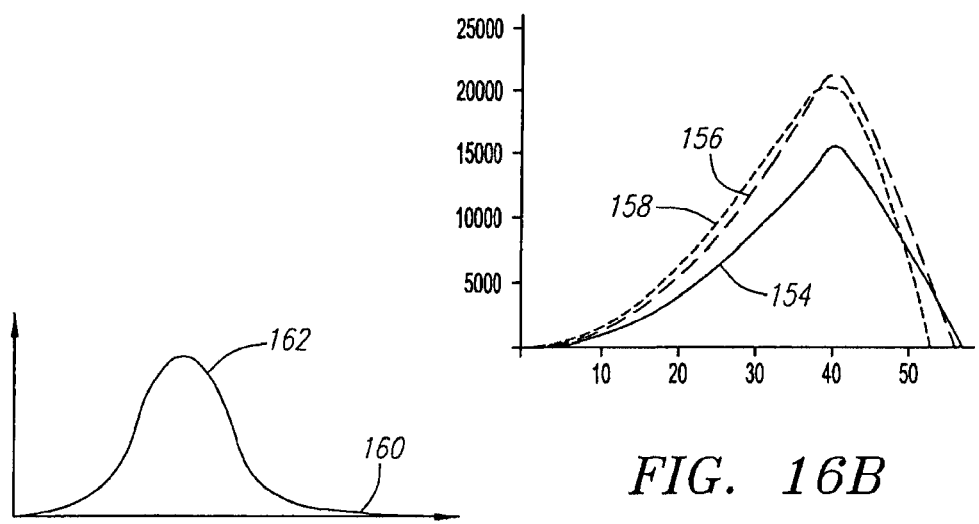

For a fixed injection velocity of the beam (fixed $\omega_i$), the applied magnetic field $B_0$ can be tuned so that different values of $\omega_e$ are obtainable. As will be shown, tuning the external magnetic field $B_0$ also gives rise to different values of the electrostatic field inside the plasma layer. This feature of the invention is illustrated in FIGS. 16A and 16B. FIG. 16A shows three plots of the electric field (in volts/cm) obtained for the same injection velocity, $\omega_i = 1.35 \times 10^7 \, s^{-1}$, but for three different values of the applied magnetic field $B_0$:

| Plot | Applied magnetic field ($B_0$) | electron angular velocity ($\omega_e$) |
|---|---|---|
| 154 | $B_0 = 2.77$ kG | $\omega_e = 0$ |
| 156 | $B_0 = 5.15$ kG | $\omega_e = 0.625 \times 10^7 \, s^{-1}$ |
| 158 | $B_0 = 15.5$ kG | $\omega_e = 1.11 \times 10^7 \, s^{-1}$ |

The values of $\omega_e$ in the table above were determined according to Eq. 4. One can appreciate that $\omega_e > 0$ means that $\Omega_0 > \omega_i$ in Eq. 4, so that electrons rotate in their counterdiamagnetic direction. FIG. 16B shows the electric potential (in volts) for the same set of values of $B_0$ and $\omega_e$. The horizontal axis, in FIGS. 16A and 16B, represents the distance from the FRC axis 78, shown in the graph in centimeters. The analytic expressions of the electric field and the electric potential are given below in conjunction with the theory of the invention. These expressions depend strongly on $\omega_e$.

The above results can be explained on simple physical grounds. When the ions rotate in the diamagnetic direction, the ions are confined magnetically by the Lorentz force. This was shown in FIG. 9A. For electrons, rotating in the same direction as the ions, the Lorentz force is in the opposite direction, so that electrons would not be confined. The electrons leave the plasma and, as a result, a surplus of positive charge is created. This sets up an electric field that prevents other electrons from leaving the plasma. The direction and the magnitude of this electric field, in equilibrium, is determined by the conservation of momentum. The relevant mathematical details are given below in conjunction with the theory of the invention.

The electrostatic field plays an essential role on the transport of both electrons and ions. Accordingly, an important aspect of this invention is that a strong electrostatic field is created inside the plasma layer 106, the magnitude of this electrostatic field is controlled by the value of the applied magnetic field $B_0$ which can be easily adjusted.

As explained, the electrostatic field is confining for electrons if $\omega_e > 0$. As shown in FIG. 16B, the depth of the well can be increased by tuning the applied magnetic field $B_0$. Except for a very narrow region near the null circle, the electrons always have a small gyroradius. Therefore, electrons respond to short-wavelength fluctuations with an anomalously fast diffusion rate. This diffusion, in fact, helps maintain the potential well once the fusion reaction occurs. The fusion product ions, being of much higher energy, leave the plasma. To maintain charge quasi-neutrality, the fusion products must pull electrons out of the plasma with them, mainly taking the electrons from the surface of the plasma layer. The density of electrons at the surface of the plasma is very low, and the electrons that leave the plasma with the fusion products must be replaced; otherwise, the potential well would disappear.

Figure 17:
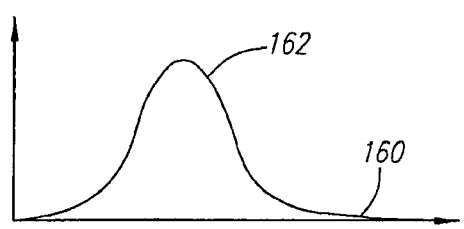
FIG. 17 shows a Maxwell distribution.

FIG. 17 shows a Maxwellian distribution 162 of electrons. Only very energetic electrons from the tail 160 of the Maxwell distribution can reach the surface of the plasma and leave with fusion ions. The tail 160 of the distribution 162 is thus continuously created by electron-electron collisions in the region of high density near the null surface. The energetic electrons still have a small gyroradius, so that anomalous diffusion permits them to reach the surface fast enough to accommodate the departing fusion product ions. The energetic electrons lose their energy ascending the potential well and leave with very little energy. Although the electrons can cross the magnetic field rapidly, due to anomalous transport, anomalous energy losses tend to be avoided because little energy is transported.

Another consequence of the potential well is a strong cooling mechanism for electrons that is similar to evaporative cooling. For example, for water to evaporate, it must be supplied the latent heat of vaporization. This heat is supplied by the remaining liquid water and the surrounding medium, which then thermalize rapidly to a lower temperature faster than the heat transport processes can replace the energy. Similarly, for electrons, the potential well depth is equivalent to water's latent heat of vaporization. The electrons supply the energy required to ascend the potential well by the thermalization process that re-supplies the energy of the Maxwell tail so that the electrons can escape. The thermalization process thus results in a lower electron temperature, as it is much faster than any heating process. Because of the mass difference between electrons and protons, the energy transfer time from protons is about 1800 times less than the electron thermalization time. This cooling mechanism also reduces the radiation loss of electrons. This is particularly important for advanced fuels, where radiation losses are enhanced by fuel ions with atomic number $Z > 1$.

The electrostatic field also affects ion transport. The majority of particle orbits in the plasma layer 106 are betatron orbits 112. Large-angle collisions, that is, collisions with scattering angles between 90° and 180°, can change a betatron orbit to a drift orbit. As described above, the direction of rotation of the drift orbit is determined by a competition between the $\vec{E} \times \vec{B}$ drift and the gradient drift. If the $\vec{E} \times \vec{B}$ drift dominates, the drift orbit rotates in the diamagnetic direction. If the gradient drift dominates, the drift orbit rotates in the counterdiamagnetic direction. This is shown in FIGS. 18A and 18B. FIG. 18A shows a transition from a betatron orbit to a drift orbit due to a 180° collision, which occurs at the point 172. The drift orbit continues to rotate in the diamagnetic direction because the $\vec{E} \times \vec{B}$ drift dominates. FIG. 18B shows another 180° collision, but in this case the electrostatic field is weak and the gradient drift dominates. The drift orbit thus rotates in the counterdiamagnetic direction.

The direction of rotation of the drift orbit determines whether it is confined or not. A particle moving in a drift orbit will also have a velocity parallel to the FRC axis. The time it takes the particle to go from one end of the FRC to the other, as a result of its parallel motion, is called transit time; thus, the drift orbits reach an end of the FRC in a time of the order of the transit time. As shown in connection with FIG. 15A, the Lorentz force at the ends is confining only for drift orbits rotating in the diamagnetic direction. After a transit time, therefore, ions in drift orbits rotating in the counterdiamagnetic direction are lost.

This phenomenon accounts for a loss mechanism for ions, which is expected to have existed in all FRC experiments. In fact, in these experiments, the ions carried half of the current and the electrons carried the other half. In these conditions the electric field inside the plasma was negligible, and the gradient drift always dominated the $\vec{E}\times\vec{B}$ drift. Hence, all the drift orbits produced by large-angle collisions were lost after a transit time. These experiments reported ion diffusion rates that were faster than those predicted by classical diffusion estimates.

If there is a strong electrostatic field, the $\vec{E}\times\vec{B}$ drift dominates the gradient drift, and the drift orbits rotate in the diamagnetic direction. This was shown above in connection with FIG. 18A. When these orbits reach the ends of the FRC, they are reflected back into the region of closed field lines by the Lorentz force; thus, they remain confined in the system.

The electrostatic fields in the colliding beam system may be strong enough, so that the $\vec{E}\times\vec{B}$ drift dominates the gradient drift. Thus, the electrostatic field of the system would avoid ion transport by eliminating this ion loss mechanism, which is similar to a loss cone in a mirror device.

Another aspect of ion diffusion can be appreciated by considering the effect of small-angle, electron-ion collisions on betatron orbits. FIG. 19A shows a betatron orbit 112; FIG. 19B shows the same orbit 112 when small-angle electron-ion collisions are considered 174; FIG. 19C shows the orbit of FIG. 19B followed for a time that is longer by a factor of ten 176; and FIG. 19D shows the orbit of FIG. 19B followed for a time longer by a factor of twenty 178. It can be seen that the topology of betatron orbits does not change due to small-angle, electron-ion collisions; however, the amplitude of their radial oscillations grows with time. In fact, the orbits shown in FIGS. 19A to 19D fatten out with time, which indicates classical diffusion.

Theory of the Invention

For the purpose of modeling the invention, a one-dimensional equilibrium model for the colliding beam system is used, as shown in FIG. 10. The results described above were drawn from this model. This model shows how to derive equilibrium expressions for the particle densities, the magnetic field, the electric field, and the electric potential. The equilibrium model presented herein is valid for a plasma fuel with one type of ions (e.g., in a D-D reaction) or multiple types of ions (e.g., D-T, D-He$^3$, and p-B$^{11}$).

Vlasov-Maxwell Equations

Equilibrium solutions for the particle density and the electromagnetic fields in a FRC are obtained by solving self-consistently the Vlasov-Maxwell equations:

$$\frac{\partial f_j}{\partial t} + (\vec{v}\cdot\nabla)f_j + \frac{e_j}{m_j}\left[\vec{E} + \frac{\vec{v}}{c}\times\vec{B}\right]\cdot\nabla_v f_j = 0 \tag{5}$$

$$\nabla\times\vec{E} = -\frac{1}{c}\frac{\partial\vec{B}}{\partial t} \tag{6}$$

$$\nabla\times\vec{B} = \frac{4\pi}{c}\sum_j e_j\int\vec{v}f_j d\vec{v} + \frac{1}{c}\frac{\partial\vec{E}}{\partial t} \tag{7}$$

$$\nabla\cdot\vec{E} = 4\pi\sum_j e_j\int f_j d\vec{v} \tag{8}$$

$$\nabla\cdot\vec{B} = 0, \tag{9}$$

where j=e, i and i=1, 2, . . . for electrons and each species of ions. In equilibrium, all physical quantities are independent of time (i.e., $\partial/\partial t=0$). To solve the Vlasov-Maxwell equations, the following assumptions and approximations are made:

(a) All the equilibrium properties are independent of axial position z (i.e., $\partial/\partial z=0$). This corresponds to considering a plasma with an infinite extension in the axial direction; thus, the model is valid only for the central part 88 of a FRC.

(b) The system has cylindrical symmetry. Hence, all equilibrium properties do not depend on θ (i.e., $\partial/\partial\theta=0$).

(c) The Gauss law, Eq. 8, is replaced with the quasi-neutrality condition: $\Sigma_j n_j e_j=0$. By assuming infinite axial extent of the FRC and cylindrical symmetry, all the equilibrium properties will depend only on the radial coordinate r. For this reason, the equilibrium model discussed herein is called one-dimensional. With these assumptions and approximations, the Vlasov-Maxwell equations reduce to:

$$(\vec{v}\cdot\nabla)f_j + \frac{e_j}{m_j}\vec{E}\cdot\nabla_v f_j + \frac{e_j}{m_j c}[\vec{v}\times\vec{B}]\cdot\nabla_v f_j = 0 \tag{10}$$

$$\nabla\times\vec{B} = \frac{4\pi}{c}\sum_j e_j\int\vec{v}f_j d\vec{v} \tag{11}$$

$$\sum_\alpha n_j e_j = 0. \tag{12}$$

Rigid Rotor Distributions

To solve Eqs. 10 through 12, distribution functions must be chosen that adequately describe the rotating beams of electrons and ions in a FRC. A reasonable choice for this purpose are the so-called rigid rotor distributions, which are Maxwellian distributions in a uniformly rotating frame of reference. Rigid rotor distributions are functions of the constants of motion:

$$f_j(r,\vec{v}) = \left(\frac{m_j}{2\pi T_j}\right)^{\frac{3}{2}} n_j(0)\exp\left[-\frac{\varepsilon_j - \omega_j P_j}{T_j}\right], \tag{13}$$

where $m_j$ is particle mass, $\vec{v}$ is velocity, $T_j$ is temperature, $n_j(0)$ is density at r=0, and $\omega_j$ is a constant. The constants of the motion are $$\varepsilon_j = \frac{m_j}{2}v^2 + e_j\Phi \text{ (for energy)}$$

and $$P_j = m_j(xv_y - yv_x) + \frac{e_j}{c}\Psi \text{ (for canonical angular momentum)},$$

where Φ is the electrostatic potential and Ψ is the flux function. The electromagnetic fields are $$E_r = -\frac{\partial\Phi}{\partial r} \text{ (electric field)}$$

and $$B_z = \frac{1}{r}\frac{\partial\Psi}{\partial r} \text{ (magnetic field)}.$$

Substituting the expressions for energy and canonical angular momentum into Eq. 13 yields $$f_j(r,\vec{v}) = \left(\frac{m_j}{2\pi T_j}\right)^{\frac{3}{2}} n_j(r) \exp\left\{-\frac{m_j}{2T_j}|\vec{v} - \vec{\omega}_j \times \vec{r}|^2\right\}, \quad (14)$$

where $$|\vec{v} - \vec{\omega}_j \times \vec{r}|^2 = (v_x + y\omega_j)^2 + (v_y - x\omega_j)^2 + v_z^2$$

and $$n_j(r) = n_j(0) \exp\left\{-\frac{1}{T_j}\left[e_j\left(\Phi - \frac{\omega_j}{c}\Psi\right) - \frac{m_j}{2}\omega_j^2 r^2\right]\right\}. \quad (15)$$

That the mean velocity in Eq. 14 is a uniformly rotating vector gives rise to the name rigid rotor. One of skill in the art can appreciate that the choice of rigid rotor distributions for describing electrons and ions in a FRC is justified because the only solutions that satisfy Vlasov's equation (Eq. 10) are rigid rotor distributions (e.g., Eq. 14). A proof of this assertion follows:

Proof

We require that the solution of Vlasov's equation (Eq. 10) be in the form of a drifted Maxwellian:

$$f_j(\vec{r},\vec{v}) = \left(\frac{m_j}{2\pi T_j(r)}\right)^{\frac{3}{2}} n_j(r) \exp\left[-\frac{m_\alpha}{2T_j(r)}(\vec{v} - \vec{u}_j(r))^2\right], \quad (16)$$

i.e., a Maxwellian with particle density $n_j(r)$, temperature $T_j(r)$, and mean velocity $u_j(r)$ that are arbitrary functions of position. Substituting Eq. 16 into the Vlasov's equation (Eq. 10) shows that (a) the temperatures $T_j(r)$ must be constants; (b) the mean velocities $\vec{u}_j(r)$ must be uniformly rotating vectors; and (c) the particle densities $n_j(r)$ must be of the form of Eq. 15. Substituting Eq. 16 into Eq. 10 yields a third-order polynomial equation in $\vec{v}$:

$$\vec{v} \cdot \nabla(\ln n_j) + \frac{m_j(\vec{v}-\vec{u}_j)}{T_j} \cdot (\vec{v} \cdot \nabla)\vec{u}_j + \frac{m_j(\vec{v}-\vec{u}_j)^2}{2T_j^2}(\vec{v} \cdot \nabla)T_j \ldots \ldots +$$

$$\frac{e_j}{T_j}\vec{E} \cdot (\vec{v} - \vec{u}_j) - \frac{e_j}{T_j c}[\vec{v} \times \vec{B}] \cdot (\vec{v} - \vec{u}_j) = 0.$$

Grouping terms of like order in $\vec{v}$ yields $$\frac{m_j}{2T_j^2}|\vec{v}|^2(\vec{v} \cdot \nabla T_j) \ldots \ldots + \frac{m_j}{T_j}(\vec{v} \cdot \nabla \vec{u}_j \cdot \vec{v}) -$$

$$\frac{m_j}{T_j^2}(\vec{v} \cdot \vec{u}_j)(\vec{v} \cdot \nabla T_j) \ldots \ldots + \vec{v} \cdot \nabla(\ln n_j) + \frac{m_j}{2T_j^2}|\vec{u}_j|^2(\vec{v} \cdot \nabla T_j) -$$

$$\frac{m_j}{T_j}(\vec{v} \cdot \nabla \vec{u}_j \cdot \vec{u}_j) - \frac{e_j}{T_j}\vec{v} \cdot \vec{E} + \frac{e_j}{cT_j}(\vec{v} \times \vec{B}) \cdot \vec{u}_j \ldots \ldots + \frac{e_j}{T_j}\vec{E} \cdot \vec{u}_j = 0.$$

For this polynomial equation to hold for all $\vec{v}$, the coefficient of each power of $\vec{v}$ must vanish.

The third-order equation yields $T_j(r)$=constant.

The second-order equation gives $$\vec{v} \cdot \nabla \vec{u}_j \cdot \vec{v} = (v_x v_y v_z) \begin{pmatrix} \frac{\partial u_x}{\partial x} & \frac{\partial u_y}{\partial x} & \frac{\partial u_z}{\partial x} \\ \frac{\partial u_x}{\partial y} & \frac{\partial u_y}{\partial y} & \frac{\partial z_x}{\partial y} \\ \frac{\partial u_x}{\partial z} & \frac{\partial u_y}{\partial z} & \frac{\partial u_z}{\partial z} \end{pmatrix} \begin{pmatrix} v_x \\ v_y \\ v_z \end{pmatrix}$$

$$= v_x^2 \frac{\partial u_x}{\partial x} + v_y^2 \frac{\partial u_y}{\partial y} + v_z^2 \frac{\partial u_z}{\partial z} + v_x v_y\left(\frac{\partial u_y}{\partial x} + \frac{\partial u_x}{\partial y}\right) \ldots \ldots +$$

$$v_x v_z\left(\frac{\partial u_z}{\partial x} + \frac{\partial u_x}{\partial z}\right) + v_y v_z\left(\frac{\partial u_z}{\partial y} + \frac{\partial u_y}{\partial z}\right)$$

$$= 0.$$

For this to hold for all $\vec{v}$, we must satisfy $$\frac{\partial u_x}{\partial x} = \frac{\partial u_y}{\partial y} = \frac{\partial u_z}{\partial z} = 0$$

and $$\left(\frac{\partial u_y}{\partial x} + \frac{\partial u_x}{\partial y}\right) = \left(\frac{\partial u_z}{\partial x} + \frac{\partial u_x}{\partial z}\right) = \left(\frac{\partial u_z}{\partial y} + \frac{\partial u_y}{\partial z}\right) = 0,$$

which is solved generally by $$\vec{u}_j(\vec{r}) = (\vec{\omega}_j \times \vec{r}) + \vec{u}_{0j} \quad (17)$$

In cylindrical coordinates, take $\vec{u}_{0j}=0$ and $\vec{\omega}_j = \omega_j \hat{z}$, which corresponds to injection perpendicular to a magnetic field in the z direction. Then, $\vec{u}_j(\vec{r}) = \omega_j r \hat{\theta}$.

The zero order equation indicates that the electric field must be in the radial direction, i.e., $\vec{E} = E_r \hat{r}$.

The first-order equation is now given by $$\vec{v} \cdot \nabla(\ln n_j) - \frac{m_j}{T_j}(\vec{v} \cdot \nabla \vec{u}_j \cdot \vec{u}_j) - \frac{e_j}{T_j}\vec{v} \cdot \vec{E} + \frac{e_j}{cT_j}(\vec{v} \times \vec{B}) \cdot \vec{u}_j = 0. \quad (18)$$

The second term in Eq. 18 can be rewritten with $$\nabla \vec{u}_j \cdot \vec{u}_j = \begin{pmatrix} \frac{\partial u_r}{\partial r} & \frac{\partial u_\theta}{\partial r} & \frac{\partial u_z}{\partial r} \\ \frac{1}{r}\frac{\partial u_r}{\partial \theta} & \frac{1}{r}\frac{\partial u_\theta}{\partial \theta} & \frac{1}{r}\frac{\partial u_z}{\partial \theta} \\ \frac{\partial u_r}{\partial z} & \frac{\partial u_\theta}{\partial z} & \frac{\partial u_z}{\partial z} \end{pmatrix} \begin{pmatrix} u_r \\ u_\theta \\ u_z \end{pmatrix} \quad (19)$$

$$= \begin{pmatrix} 0 & \omega_j & 0 \\ 0 & 0 & 0 \\ 0 & 0 & 0 \end{pmatrix} \begin{pmatrix} 0 \\ \omega_j r \\ 0 \end{pmatrix}$$

$$= \omega_j^2 r \hat{r}.$$

The fourth term in Eq. 18 can be rewritten with $$(\vec{v} \times \vec{B}) \cdot \vec{u}_j = \vec{v} \cdot (\vec{B} \times \vec{u}_j) \quad (20)$$

$$= \vec{v} \cdot ((\nabla \times \vec{A}) \times \vec{u}_j)$$

$$= \vec{v} \cdot \left[\left(\frac{1}{r}\frac{\partial}{\partial r}(rA_\theta)\hat{z}\right) \times (-\omega_j r \hat{\theta})\right]$$

-continued $$= \vec{v} \cdot \omega_j \frac{\partial}{\partial r}(rA_\theta)\hat{r}$$

Using Eqs. 19 and 20, the first-order Eq. 18 becomes $$\frac{\partial}{\partial r}(\ln n_j) - \frac{m_j}{T_j}\omega_j^2 r - \frac{e_j}{T_j}E_r + \frac{e_j\omega_j}{cT_j}\frac{\partial}{\partial r}(rA_\theta(r)) = 0.$$

The solution of this equation is $$n_j(r) = n_j(0)\exp\left[\frac{m_j\omega_j^2 r^2}{2T_j} - \frac{e_j\Phi(r)}{T_j} - \frac{e_j\omega_j rA_\theta(r)}{cT_j}\right], \quad (21)$$

where $E_r = -d\Phi/dr$ and $n_j(0)$ is given by $$n_j(0) = n_{j0}\exp\left[-\frac{m_j\omega_j^2 r_0^2}{2T_j} + \frac{e_j\Phi(r_0)}{T_j} + \frac{e_j\omega_j r_0 A_\theta(r_0)}{cT_j}\right]. \quad (22)$$

Here, $n_{j0}$ is the peak density at $r_0$.

Solution of Vlasov-Maxwell Equations

Now that it has been proved that it is appropriate to describe ions and electrons by rigid rotor distributions, the Vlasov's equation (Eq. 10) is replaced by its first-order moments, i.e., $$-n_j m_j r\omega_j^2 = n_j e_j\left[E_r + \frac{r\omega_j}{c}B_z\right] - T_j\frac{dn_j}{dr}, \quad (23)$$

which are conservation of momentum equations. The system of equations to obtain equilibrium solutions reduces to:

$$-n_j m_j r\omega_j^2 = n_j e_j\left[E_r + \frac{r\omega_j}{c}B_z\right] - T_j\frac{dn_j}{dr}, \quad (24)$$

$$j = e, i = 1,2,\ldots$$

$$-\frac{\partial}{\partial r}\frac{1}{r}\frac{\partial \Psi}{\partial r} = -\frac{\partial B_z}{\partial r} = \frac{4\pi}{c}j_\theta = \frac{4\pi}{c}r\sum_j n_j e_j\omega_j \quad (25)$$

$$\sum_j n_j e_j \cong 0. \quad (26)$$

Solution for Plasma with One Type of Ion

Consider first the case of one type of ion fully stripped. The electric charges are given by $e_j = -e, Ze$. Solving Eq. 24 for $E_r$ with the electron equation yields $$E_r = \frac{m}{e}r\omega_e^2 - \frac{r\omega_e}{c}B_z - \frac{T_e}{en_e}\frac{dn_e}{dr}, \quad (27)$$

and eliminating $E_r$ from the ion equation yields $$\frac{1}{r}\frac{d\log n_i}{dr} = \frac{Z_i e}{c}\frac{(\omega_i - \omega_e)}{T_i}B_z - \frac{Z_i T_e}{T_i}\frac{1}{r}\frac{d\log n_e}{dr} + \frac{m_i\omega_i^2}{T_i} + \frac{m Z_i\omega_e^2}{T_i}. \quad (28)$$

Differentiating Eq. 28 with respect to r and substituting Eq. 25 for $dB_z/dr$ yields $$-\frac{dB_z}{dr} = \frac{4\pi}{c}n_e er(\omega_i - \omega_e) \text{ and } Z_i n_i = n_e,$$

with $T_e = T_i$ =constant, and $\omega_i$, $\omega_e$, constants, obtaining $$\frac{1}{r}\frac{d}{dr}\frac{1}{r}\frac{d\log n_i}{dr} = -\frac{4\pi n_e Z_i e^2}{T_i}\frac{(\omega_i - \omega_e)^2}{c^2} - \frac{Z_i T_e}{T_i}\frac{1}{r}\frac{d}{dr}\frac{1}{r}\frac{d\log n_e}{dr}. \quad (29)$$

The new variable $\xi$ is introduced:

$$\xi = \frac{r^2}{2r_0^2} \Rightarrow \frac{1}{r}\frac{d}{dr}\frac{1}{r}\frac{d}{dr} = \frac{1}{r_0^4}\frac{d^2}{d^2\xi}. \quad (30)$$

Eq. 29 can be expressed in terms of the new variable $\xi$:

$$\frac{d^2\log n_i}{d^2\xi} = -\frac{4\pi n_e Z_i e^2 r_0^4}{T_i}\frac{(\omega_i - \omega_e)^2}{c^2} - \frac{Z_i T_e}{T_i}\frac{d^2\log n_e}{d^2\xi}. \quad (31)$$

Using the quasi-neutrality condition, $$n_e = Z_i n_i \Rightarrow \frac{d^2\log n_e}{d^2\xi} = \frac{d^2\log n_i}{d^2\xi}, \quad (32)$$

yields $$\frac{d^2\log n_i}{d^2\xi} = -\frac{r_0^4}{\frac{(T_i + Z_i T_e)}{4\pi Z_i^2 e^2}\frac{c^2}{(\omega_i - \omega_e)^2}}n_i$$

$$= -\frac{r_0^4}{\frac{\left(T_e + \frac{T_i}{Z_i}\right)}{4\pi n_{e0} e^2}\frac{c^2}{(\omega_i - \omega_e)^2}}\frac{n_i}{n_{i0}}$$

$$= -8\left(\frac{r_0}{\Delta r}\right)^2\frac{n_i}{n_{i0}}.$$

Here is defined $$r_0\Delta r \equiv 2\sqrt{2}\left\{\frac{T_e + \frac{T_i}{Z_i}}{4\pi n_{e0} e^2}\right\}^{\frac{1}{2}}\frac{c}{|\omega_i - \omega_e|}, \quad (33)$$

where the meaning of $\Delta r$ will become apparent soon. If $N_i = n_i/n_{i0}$, where $n_{i0}$ is the peak density at $r = r_0$, Eq. 32 becomes $$\frac{d^2\log N_i}{d^2\xi} = -8\left(\frac{r_0}{\Delta r}\right)^2 N_i. \quad (34)$$

Using another new variable, $$\chi = 2\frac{r_0}{\Delta r}\xi,$$

yields $\frac{d^2 N_i}{d^2\chi} = -2N_i,$ the solution to which is $$N_i = \frac{1}{\cosh^2(\chi - \chi_0)},$$

where $\chi_0 = \chi(r_0)$ because of the physical requirement that $N_i(r_0)=1$.

Finally, the ion density is given by $$n_i = \frac{n_{i0}}{\cosh^2 2\left(\frac{r_0}{\Delta r}\right)\left(\xi - \frac{1}{2}\right)} = \frac{n_{i0}}{\cosh^2\left(\frac{r^2 - r_0^2}{r_0 \Delta r}\right)}. \quad (35)$$

The significance of $r_0$ is that it is the location of peak density. Note that $n_i(0)=n_i(\sqrt{2}r_0)$. With the ion density known, $B_z$ can be calculated using Eq. 11, and $E_r$ can be calculated using Eq. 27.

The electric and magnetic potentials are $$\Phi = -\int_{r'=0}^{r'=r} E_r(r')dr' \quad (36)$$

and $$A_\theta = \frac{1}{r}\int_{r'=0}^{r'=r} r' B_z(r')dr'$$

$$\Psi = rA_\theta \text{ (flux function)}$$

Taking $r=\sqrt{2}r_0$ to be the radius at the wall (a choice that will become evident when the expression for the electric potential $\Phi(r)$ is derived, showing that at $r=\sqrt{2}r_0$ the potential is zero, i.e., a conducting wall at ground), the line density is $$N_e = Z_i N_i \quad (37)$$

$$= \int_{r=0}^{r=\sqrt{2}r_0} \frac{n_{e0} 2\pi r dr}{\cosh^2\left(\frac{r^2-r_0^2}{r_0\Delta r}\right)}$$

$$= 2\pi n_{e0} r_0 \Delta r \tanh\frac{r_0}{\Delta r} \ldots$$

$$\ldots \cong 2\pi n_{e0} r_0 \Delta r \text{ (because } r_0 \gg \Delta r\text{)}$$

Thus, $\Delta r$ represents an "effective thickness." In other words, for the purpose of line density, the plasma can be thought of as concentrated at the null circle in a ring of thickness $\Delta r$ with constant density $n_{e0}$.

The magnetic field is $$B_z(r) = B_z(0) - \frac{4\pi}{c} \int_{r'=0}^{r'=r} dr' n_e er'(\omega_i - \omega_e). \quad (38)$$

The current due to the ion and electron beams is $$I_\theta = \int_0^{\sqrt{2}r_0} j_\theta dr = \frac{N_e e(\omega_i - \omega_e)}{2\pi} \quad (39)$$

$$j_\theta = n_0 er(\omega_i - \omega_e).$$

Using Eq. 39, the magnetic field can be written as $$B_z(r) = B_z(0) - \frac{2\pi}{c}I_\theta - \frac{2\pi}{c}I_\theta \tanh\frac{r^2-r_0^2}{r_0\Delta r} \quad (40)$$

$$= -B_0 - \frac{2\pi}{c}I_\theta \tanh\frac{r^2-r_0^2}{r_0\Delta r}.$$

In Eq. 40, $$B_z(0) = -B_0 + \frac{2\pi}{c}I_\theta \text{ and}$$

$$B_z(\sqrt{2}r_0) = -B_0 - \frac{2\pi}{c}I_\theta.$$

If the plasma current $I_\theta$ vanishes, the magnetic field is constant, as expected.

Figure 20A:
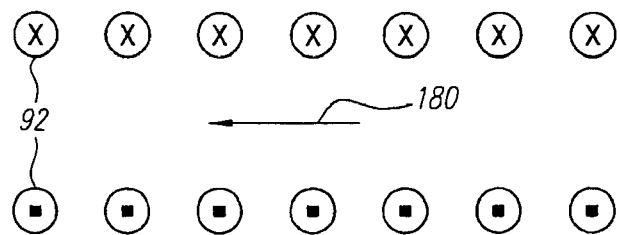
FIGS. 20A, 20B and 20C show the reversal of the magnetic field in a FRC.
Figure 20B:
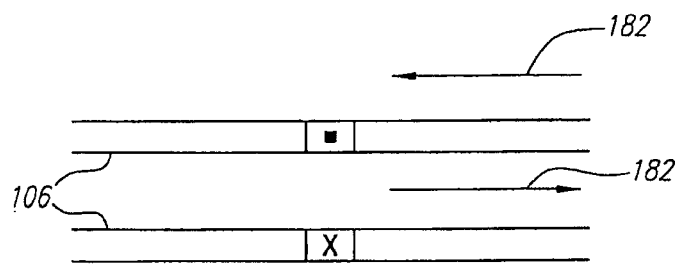
Figure 20C:
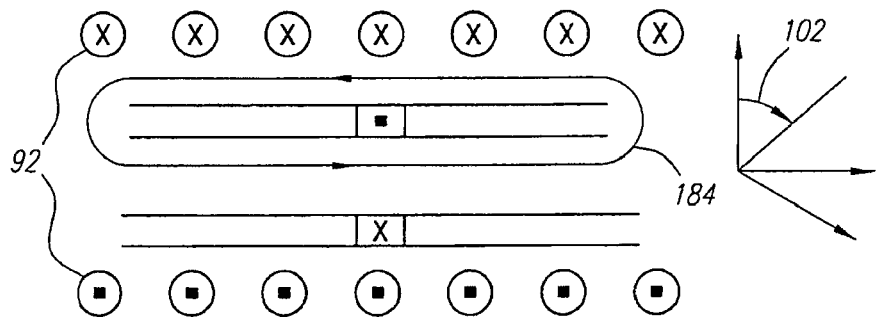
Figure 21A:
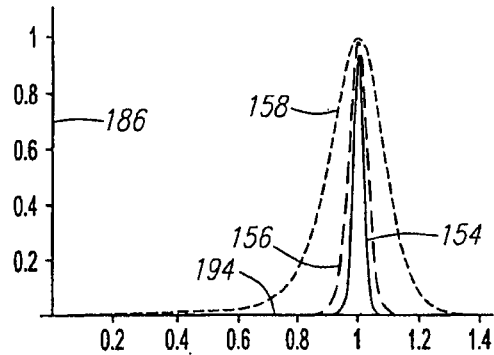
FIGS. 21A, 21B, 21C and 21D show the effects due to tuning of the external magnetic field $B_0$ in a FRC.
Figure 21B:
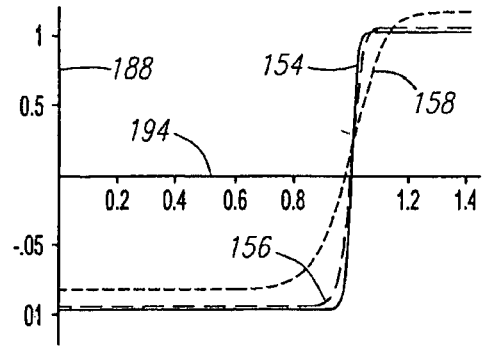
Figure 21C:
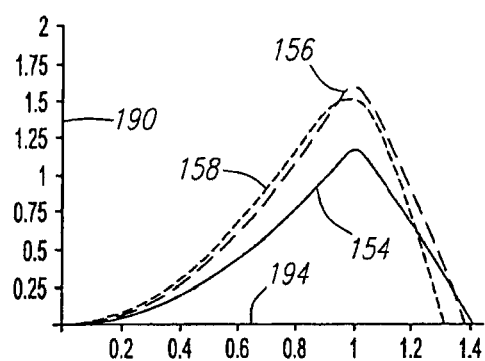
Figure 21D:
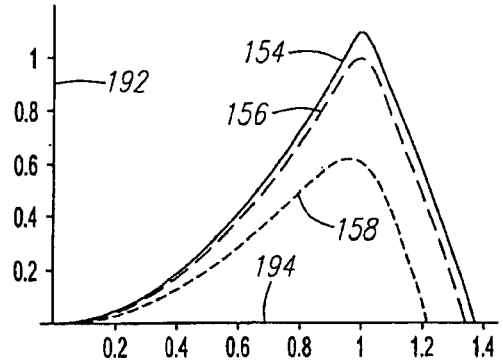
Figure 22A:
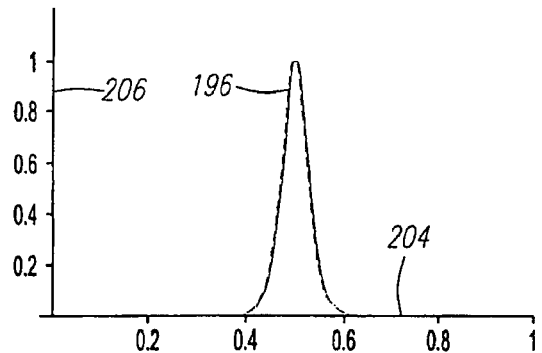
FIGS. 22A, 22B, 22C and 22D show iteration results for a D-T plasma.
Figure 22B:
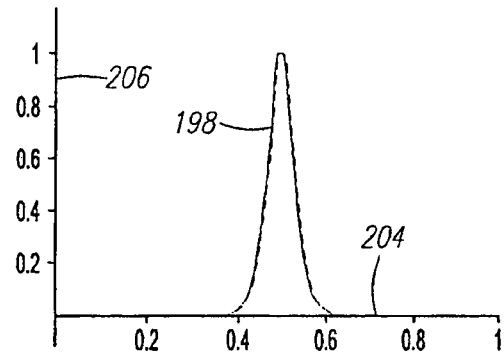
Figure 22C:
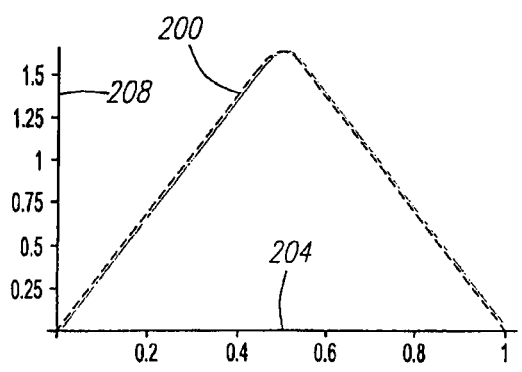
Figure 22D:
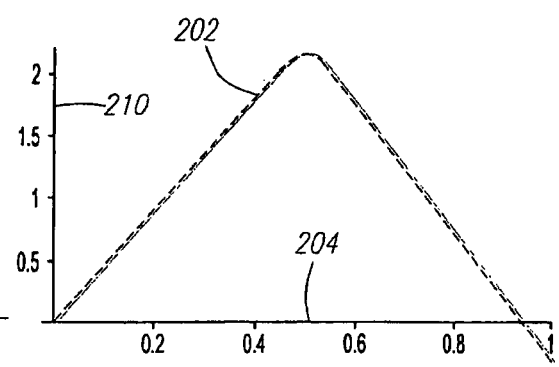
Figure 23A:
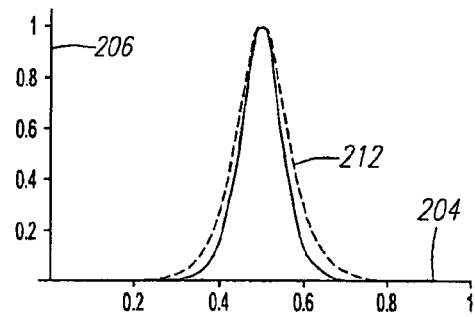
FIGS. 23A, 23B, 23C, and 23D show iteration results for a D-He$^3$ plasma.
Figure 23B:
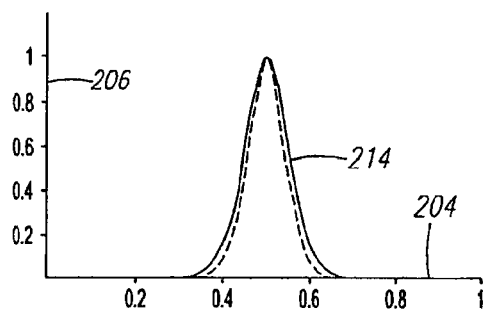
Figure 23C:
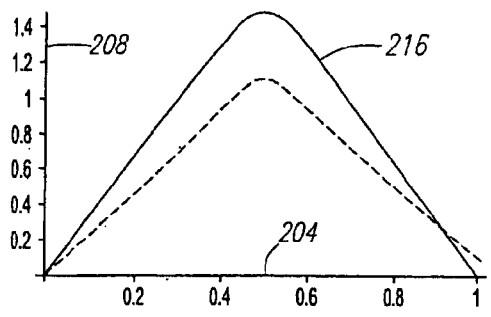
Figure 23D:
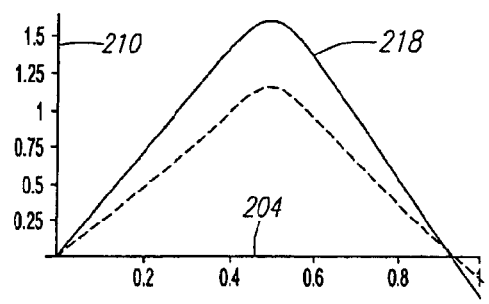
Figure 24A:
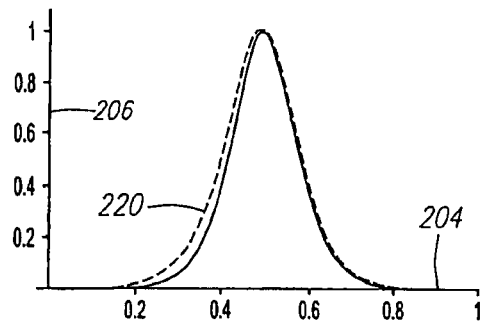
FIG. 24 shows iteration results for a p-B$^{11}$ plasma.
Figure 24B:
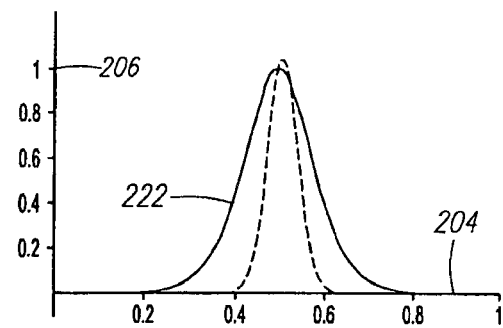
Figure 24C:
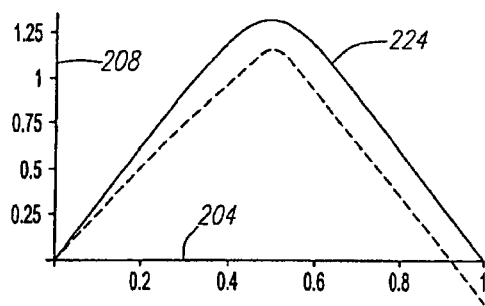
Figure 24D:
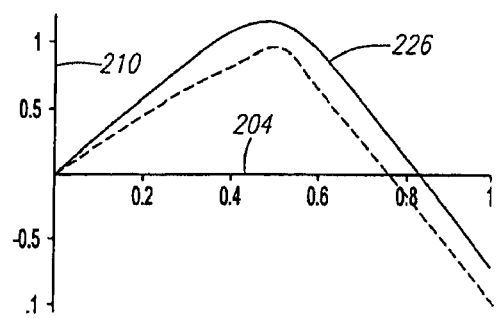

These relations are illustrated in FIGS. 20A through 20C. FIG. 20A shows the external magnetic field $\vec{B}_0$ 180. FIG. 20B shows the magnetic field due to the ring of current 182, the magnetic field having a magnitude of $(2\pi/c)I_\theta$. FIG. 20C shows field reversal 184 due to the overlapping of the two magnetic fields 180,182.

The magnetic field is $$B_z(r) = -B_0\left[1 + \frac{2\pi I_\theta}{cB_0}\tanh\frac{r^2-r_0^2}{r_0\Delta r}\right] \quad (41)$$

$$= -B_0\left[1 + \sqrt{\beta}\tanh\left(\frac{r^2-r_0^2}{r_0\Delta r}\right)\right],$$

using the following definition for $\beta$:

$$\frac{2\pi}{c}\frac{I_\theta}{B_0} = \frac{N_e e(\omega_i - \omega_e)}{cB_0} \quad (42)$$

$$= \frac{2\pi}{c}n_{e0}\frac{r_0\Delta r e(\omega_i - \omega_e)}{B_0} \ldots$$

$$\ldots = \frac{2\pi}{c}2\sqrt{2}\left[\frac{T_e + (T_i/Z_i)}{4\pi n_{e0} e^2}\right]^{\frac{1}{2}}\frac{cn_{e0}}{\omega_i - \omega_e}\frac{e(\omega_i - \omega_e)}{B_0} \ldots$$

$$\ldots = \left[\frac{8\pi(n_{e0}T_e + n_{i0}T_i)}{B_0^2}\right]^{\frac{1}{2}} \equiv \sqrt{\beta}.$$

With an expression for the magnetic field, the electric potential and the magnetic flux can be calculated. From Eq. 27, $$E_r = -\frac{r\omega_e}{c}B_z - \frac{T_e}{e}\frac{d\ln n_e}{dr} + \frac{m}{e}r\omega_e^2 = -\frac{d\Phi}{dr} \quad (43)$$

Integrating both sides of Eq. 28 with respect to r and using the definitions of electric potential and flux function, $$\Phi \equiv -\int_{r'=0}^{r'=r} E_r dr' \text{ and } \Psi \equiv \int_{r'=0}^{r'=r} B_z(r')r'\,dr', \quad (44)$$

which yields $$\Phi = \frac{\omega_e}{e}\Psi + \frac{T_e}{e}\ln\frac{n_e(r)}{n_e(0)} - \frac{m}{e}\frac{r^2\omega_e^2}{2}. \quad (45)$$

Now, the magnetic flux can be calculated directly from the expression of the magnetic field (Eq. 41):

$$\Psi = \int_{r'=0}^{r'=r} -B_0 \left[1 + \sqrt{\beta} \tanh \frac{r^2 - r_0^2}{r_0 \Delta r}\right] r' \, dr' \quad (46)$$

$$\ldots = -\frac{B_0 r^2}{2} - \frac{B_0 \sqrt{\beta}}{2} r_0 \Delta r \left[\begin{array}{c} \log\left(\cosh \frac{r^2 - r_0^2}{r_0 \Delta r}\right) - \\ \log\left(\cosh \frac{r_0}{\Delta r}\right) \end{array}\right] \ldots$$

$$\ldots = -\frac{B_0 r^2}{2} + B_0 \frac{\sqrt{\beta} \, r_0 \Delta r}{4} \log \frac{n_e(r)}{n_e(0)}.$$

Substituting Eq. 46 into Eq. 45 yields $$\Phi = \frac{\omega_e}{c} \frac{B_0 \sqrt{\beta} \, r_0 \Delta r}{4} \log \frac{n_e(r)}{n_e(0)} + \frac{T_e}{e} \ln \frac{n_e(r)}{n_e(0)} - \frac{\omega_e}{c} \frac{B_0 r^2}{2} - \frac{m}{e} \frac{r^2 \omega_e^2}{2}. \quad (47)$$

Using the definition of $\beta$, $$\frac{\omega_e}{c} B_0 \sqrt{\beta} \, r_0 \Delta r = \frac{\omega_e}{c} \sqrt{8\pi(n_{e0}T_e + n_{i0}T_i)} \quad (48)$$

$$2 \frac{\left(\frac{T_e + T_i}{2}\right)^{\frac{1}{2}}}{\sqrt{4\pi n_{e0} e^2}} \frac{c}{(\omega_i - \omega_e)} \ldots$$

$$\ldots = 4 \frac{\omega_e}{\omega_i - \omega_e} \frac{(n_{e0}T_e + n_{i0}T_i)}{n_{e0} e}.$$

Finally, using Eq. 48, the expressions for the electric potential and the flux function become $$\Psi(r) = -\frac{B_0 r^2}{2} + \frac{c}{\omega_i - \omega_e} \left(\frac{n_{e0}T_e + n_{i0}T_i}{n_{e0} e}\right) \ln \frac{n_e(r)}{n_e(0)} \quad (49)$$

and $$\Phi(r) = \left[\frac{\omega_e}{\omega_i - \omega_e} \frac{(n_{e0}T_e + n_{i0}T_i)}{n_{e0} e} + \frac{T_e}{e}\right] \quad (50)$$

$$\ln \frac{n_e(r)}{n_e(0)} - \frac{\omega_e}{c} \frac{B_0 r^2}{2} - \frac{m}{e} \frac{r^2 \omega_e^2}{c}.$$

Relationship Between $\omega_i$ and $\omega_e$

An expression for the electron angular velocity $\omega_e$ can also be derived from Eqs. 24 through 26. It is assumed that ions have an average energy $\frac{1}{2} m_i (r \omega_i)^2$, which is determined by the method of formation of the FRC. Therefore, $\omega_i$ is determined by the FRC formation method, and $\omega_e$ can be determined by Eq. 24 by combining the equations for electrons and ions to eliminate the electric field:

$$-[n_e m r \omega_e^2 + n_i m_i r \omega_i^2] = \frac{n_e e r}{c} (\omega_i - \omega_e) B_z - T_e \frac{dn_e}{dr} - T_i \frac{dn_i}{dr}. \quad (51)$$

Eq. 25 can then be used to eliminate $(\omega_i - \omega_e)$ to obtain $$[n_e m r \omega_e^2 + n_i m_i r \omega_i^2] = \frac{d}{dr} \left(\frac{B_z^2}{8\pi} + \sum_j n_j T_j\right). \quad (52)$$

Eq. 52 can be integrated from $r=0$ to $r_B = \sqrt{2} r_0$. Assuming $r_0/\Delta r \gg 1$, the density is very small at both boundaries and $B_z = -B_0(1 \pm \sqrt{\beta})$. Carrying out the integration shows $$[n_{e0} m \omega_e^2 + n_{i0} m_i r \omega_i^2] r_0 \Delta r = \frac{B_0}{2\pi} [8\pi (n_{e0}T_e + n_{i0}T_i)]^{\frac{1}{2}}. \quad (53)$$

Using Eq. 33 for $\Delta r$ yields an equation for $\omega_e$:

$$\omega_i^2 + \frac{Zm}{m_i} \omega_e^2 = \Omega_0 (\omega_i - \omega_e), \quad (54)$$

where $$\Omega_0 = \frac{ZeB_0}{m_i c}.$$

Some limiting cases derived from Eq. 54 are:

1. $\omega_i = 0$ and $\omega_e = -\frac{eB_0}{mc}$;

2. $\omega_e = 0$ and $\omega_i = \Omega_0$; and

3. $\frac{Zm}{m_i} \omega_e^2 \ll \omega_i^2$ and $\omega_e \cong \omega_i \left(1 - \frac{\omega_i}{\Omega_0}\right)$.

In the first case, the current is carried entirely by electrons moving in their diamagnetic direction ($\omega_e < 0$). The electrons are confined magnetically, and the ions are confined electrostatically by $$E_r = \frac{T_i}{Zen_i} \frac{dn_i}{dr} \begin{array}{l} \leq 0 \text{ for } r \geq r_0 \\ \geq 0 \text{ for } r \leq r_0. \end{array} \quad (55)$$

In the second case, the current is carried entirely by ions moving in their diamagnetic direction ($\omega_i > 0$). If $\omega_i$ is specified from the ion energy $\frac{1}{2} m_i (r \omega_i)^2$, determined in the formation process, then $\omega_e = 0$ and $\Omega_0 = \omega_i$ identifies the value of $B_0$, the externally applied magnetic field. The ions are magnetically confined, and electrons are electrostatically confined by $$E_r = -\frac{T_e}{en_e} \frac{dn_e}{dr} \begin{array}{l} \geq 0 \text{ for } r \geq r_0 \\ \leq 0 \text{ for } r \leq r_0. \end{array} \quad (56)$$

In the third case, $\omega_e > 0$ and $\Omega_0 > \omega_i$. Electrons move in their counter diamagnetic direction and reduce the current density. From Eq. 33, the width of the distribution $n_i(r)$ is increased; however, the total current/unit length is $$I_\theta = \int_{r=0}^{r_B} j_\theta \, dr = \frac{N_e}{2\pi} e(\omega_i - \omega_e), \text{ where} \quad (57)$$

$$N_e = \int_{r=0}^{r_B} 2\pi r \, dn_e = 2\pi r_0 \Delta r n_{e0}. \quad (58)$$

Here, $r_B = \sqrt{2} r_0$ and $r_0 \Delta r \propto (\omega_i - \omega_e)^{-1}$ according to Eq. 33. The electron angular velocity $\omega_e$ can be increased by tuning the applied magnetic field $B_0$. This does not change either $I_\theta$ or the maximum magnetic field produced by the plasma current, which is $B_0 \sqrt{\beta} = (2\pi/c) I_\theta$. However, it does change $\Delta r$ and, significantly, the potential $\Phi$. The maximum value of $\Phi$ is increased, as is the electric field that confines the electrons.

Tuning the Magnetic Field

In FIGS. 21 A-D, the quantities $n_e/n_{e0}$ 186, $B_z/(B_0\sqrt{\beta})$ 188, $\Phi/\Phi_0$ 190, and $\Psi/\Psi_0$ 192 are plotted against $r/r_0$ 194 for various values of $B_0$. The values of potential and flux are normalized to $\Phi_0 = 20(T_e+T_i)/e$ and $\Psi_0 = (c/\omega_i)\Phi_0$. A deuterium plasma is assumed with the following data: $n_{e0} = n_{i0} = 10^{15}$ cm$^{-3}$; $r_0 = 40$ cm; $\frac{1}{2}m_i(r_0\omega_i)^2 = 300$ keV; and $T_e = T_i = 100$ keV. For each of the cases illustrated in FIG. 21, $\omega_i = 1.35 \times 10^7$ s$^{-1}$, and $\omega_e$ is determined from Eq. 54 for various values of $B_0$:

| Plot | applied magnetic field ($B_0$) | electron angular velocity ($\omega_e$) |
|---|---|---|
| 154 | $B_0 = 2.77$ kG | $\omega_e = 0$ |
| 156 | $B_0 = 5.15$ kG | $\omega_e = 0.625 \times 10^7$ s$^{-1}$ |
| 158 | $B_0 = 15.5$ kG | $\omega_e = 1.11 \times 10^7$ s$^{-1}$ |

The case of $\omega_e = \omega_i$ and $B_0 = 1.385$ kG involves magnetic confinement of both electrons and ions. The potential reduces to $\Phi/\Phi_0 = m_i(r\omega_i)^2/[80(T_e+T_i)]$, which is negligible compared to the case $\omega_e = 0$. The width of the density distribution $\Delta r$ is reduced by a factor of 2, and the maximum magnetic field $B_0\sqrt{\beta}$ is the same as for $\omega_e = 0$.

Solution for Plasmas of Multiple Types of Ions

This analysis can be carried out to include plasmas comprising multiple types of ions. Fusion fuels of interest involve two different kinds of ions, e.g., D-T, D-He$^3$, and H-B$^{11}$. The equilibrium equations (Eqs. 24 through 26) apply, except that j=e, 1, 2 denotes electrons and two types of ions where $Z_1 = 1$ in each case and $Z_2 = Z = 1$, 2, 5 for the above fuels. The equations for electrons and two types of ions cannot be solved exactly in terms of elementary functions. Accordingly, an iterative method has been developed that begins with an approximate solution.

The ions are assumed to have the same values of temperature and mean velocity $V_i = r\omega_i$. Ion-ion collisions drive the distributions toward this state, and the momentum transfer time for the ion-ion collisions is shorter than for ion-electron collisions by a factor of an order of 1000. By using an approximation, the problem with two types of ions can be reduced to a single ion problem. The momentum conservation equations for ions are $$-n_1 m_1 r \omega_1^2 = n_1 e \left[E_r + \frac{r\omega_1}{c}B_z\right] - T_1 \frac{dn_1}{dr} \text{ and} \quad (59)$$

$$-n_2 m_2 r \omega_2^2 = n_2 Z e \left[E_r + \frac{r\omega_2}{c}B_z\right] - T_2 \frac{dn_2}{dr}. \quad (60)$$

In the present case, $T_1 = T_2$ and $\omega_1 = \omega_2$. Adding these two equations results in $$-n_i \langle m_i \rangle \omega_i^2 = n_i \langle Z \rangle e \left[E_r + \frac{r\omega_i}{c}B_z\right] - T_i \frac{dn_i}{dr}, \quad (61)$$

where $n_i = n_1 + n_2$; $\omega_i = \omega_1 = \omega_2$; $T_i = T_1 = T_2$; $n_i\langle m_i\rangle = n_1 m_1 + n_2 m_2$; and $n_i\langle Z\rangle = n_1 + n_2 Z$.

The approximation is to assume that $\langle m_i \rangle$ and $\langle Z \rangle$ are constants obtained by replacing $n_1(r)$ and $n_2(r)$ by $n_{10}$ and $n_{20}$, the maximum values of the respective functions. The solution of this problem is now the same as the previous solution for the single ion type, except that $\langle Z \rangle$ replaces $Z$ and $\langle m_i \rangle$ replaces $m_i$. The values of $n_1$ and $n_2$ can be obtained from $n_1 + n_2 = n_i$ and $n_1 + Z n_2 = n_e = \langle Z \rangle n_i$. It can be appreciated that $n_1$ and $n_2$ have the same functional form.

Now the correct solution can be obtained by iterating the equations:

$$\frac{d \log N_1}{d\xi} = m_1 r_0^2 \Omega_1 \frac{(\omega_i - \omega_e)}{T_i}\frac{B_z(\xi)}{B_0} - \frac{T_e}{T_i}\frac{d\log N_e}{d\xi} + \frac{m_1(\omega_i r_0)^2}{T_i} \quad (62)$$

and $$\frac{d \log N_2}{d\xi} = m_2 r_0^2 \Omega_2 \frac{(\omega_i - \omega_e)}{T_i}\frac{B_z(\xi)}{B_0} - \frac{ZT_e}{T_i}\frac{d\log N_e}{d\xi} + \frac{m_2(\omega_i r_0)^2}{T_i}, \quad (63)$$

where $$N_1 = \frac{n_1(r)}{n_{10}}, N_2 = \frac{n_2(r)}{n_{20}}, \xi = \frac{r^2}{2r_0^2}, \Omega_1 = \frac{eB_0}{m_1 c}, \text{ and}$$

$$\Omega_2 = \frac{ZeB_0}{m_2 c}.$$

The first iteration can be obtained by substituting the approximate values of $B_z(\xi)$ and $N_e(\xi)$ in the right hand sides of Eqs. 62 and 63 and integrating to obtain the corrected values of $n_1(r)$, $n_2(r)$, and $B_z(r)$.

Calculations have been carried out for the data shown in Table 1, below. Numerical results for fusion fuels are shown in FIGS. 22 A-D through 24 A-D wherein the quantities $n_1/n_{10}$ 206, $\Phi/\Phi_0$ 208, and $\Psi/\Psi_0$ 210 are plotted against $r/r_0$ 204. FIGS. 22 A-D shows the first approximation (solid lines) and the final results (dotted lines) of the iterations for D-T for the normalized density of D 196, the normalized density of T 198, the normalized electric potential 200, and the normalized flux 202. FIGS. 23 A-D show the same iterations for D-He$^3$ for the normalized density of D 212, the normalized density of He$^3$ 214, the normalized electric potential 216, and the normalized flux 218. FIGS. 24 A-D show the same iterations for p-B$^{11}$ for the normalized density of p 220, the normalized density of B$^{11}$ 222, the normalized electric potential 224, and the normalized flux 226. Convergence of the iteration is most rapid for D-T. In all cases the first approximation is close to the final result.

TABLE 1

Numerical data for equilibrium calculations for different fusion fuels

| Quantity | Units | D-T | D-He$^3$ | p-B$^{11}$ |
|---|---|---|---|---|
| $n_{e0}$ | cm$^{-3}$ | $10^{15}$ | $10^{15}$ | $10^{15}$ |
| $n_{10}$ | cm$^{-3}$ | $0.5 \times 10^{15}$ | $1/3 \times 10^{15}$ | $0.5 \times 10^{15}$ |
| $n_{20}$ | cm$^{-3}$ | $0.5 \times 10^{15}$ | $1/3 \times 10^{15}$ | $10^{14}$ |
| $v_1 = v_2$ | $\frac{cm}{sec}$ | $0.54 \times 10^9$ | $0.661 \times 10^9$ | $0.764 \times 10^9$ |
| $\frac{1}{2}m_1 v_1^2$ | keV | 300 | 450 | 300 |
| $\frac{1}{2}m_2 v_2^2$ | keV | 450 | 675 | 3300 |
| $\omega_i = \omega_1 = \omega_2$ | rad/s | $1.35 \times 10^7$ | $1.65 \times 10^7$ | $1.91 \times 10^7$ |
| $r_0$ | cm | 40 | 40 | 40 |
| $B_0$ | kG | 5.88 | 8.25 | 15.3 |
| $\langle Z_i \rangle$ | None | 1 | 3/2 | 1.67 |
| $\langle m_i \rangle$ | $m_p$ | 5/2 | 5/2 | 2.67 |
| $\Omega_0 = \frac{\langle Z_i \rangle eB_0}{\langle m_i \rangle c}$ | rad/s | $2.35 \times 10^7$ | $4.95 \times 10^7$ | $9.55 \times 10^7$ |

TABLE 1-continued

Numerical data for equilibrium calculations for different fusion fuels

| Quantity | Units | D-T | D-He$^3$ | p-B$^{11}$ |
|---|---|---|---|---|
| $\omega_e = \omega_i\left[1 - \frac{\omega_i}{\Omega_0}\right]$ | rad/s | $0.575 \times 10^7$ | $1.1 \times 10^7$ | $1.52 \times 10^7$ |
| $T_e$ | keV | 96 | 170 | 82 |
| $T_i$ | keV | 100 | 217 | 235 |
| $r_0 \Delta r$ | cm$^2$ | 114 | 203 | 313 |
| β | None | 228 | 187 | 38.3 |

Structure of the Containment System

Figure 25:
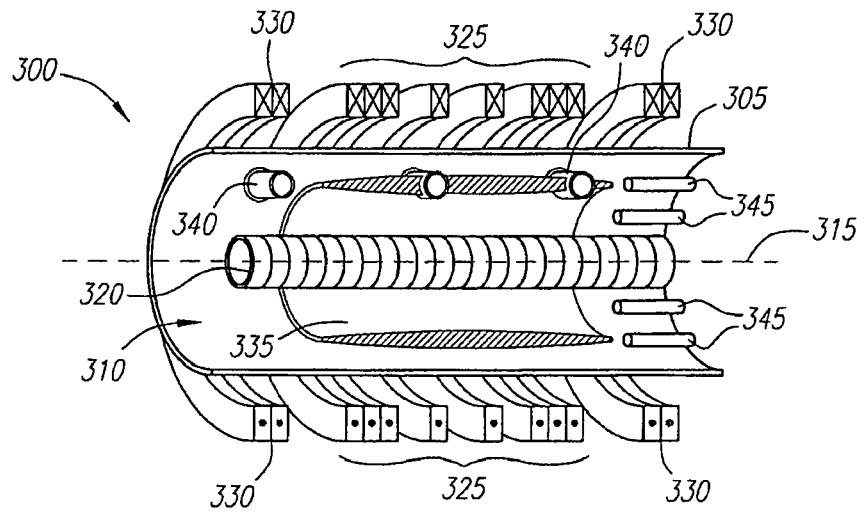
FIG. 25 shows an exemplary confinement chamber.

FIG. 25 illustrates a preferred embodiment of a containment system 300 according to the present invention. The containment system 300 comprises a chamber wall 305 that defines therein a confining chamber 310. Preferably, the chamber 310 is cylindrical in shape, with principle axis 315 along the center of the chamber 310. For application of this containment system 300 to a fusion reactor, it is necessary to create a vacuum or near vacuum inside the chamber 310. Concentric with the principle axis 315 is a betatron flux coil 320, located within the chamber 310. The betatron flux coil 320 comprises an electrical current carrying medium adapted to direct current around a long coil, as shown, which preferably comprises parallel winding multiple separate coils, and most preferably parallel windings of about four separate coils, to form a long coil. Persons skilled in the art will appreciate that current through the betatron coil 320 will result in a magnetic field inside the betatron coil 320, substantially in the direction of the principle axis 315.

Around the outside of the chamber wall 305 is an outer coil 325. The outer coil 325 produce a relatively constant magnetic field having flux substantially parallel with principle axis 315. This magnetic field is azimuthally symmetrical. The approximation that the magnetic field due to the outer coil 325 is constant and parallel to axis 315 is most valid away from the ends of the chamber 310. At each end of the chamber 310 is a mirror coil 330. The mirror coils 330 are adapted to produce an increased magnetic field inside the chamber 310 at each end, thus bending the magnetic field lines inward at each end. (See FIGS. 8 and 10.) As explained, this bending inward of the field lines helps to contain the plasma 335 in a containment region within the chamber 310 generally between the mirror coils 330 by pushing it away from the ends where it can escape the containment system 300. The mirror coils 330 can be adapted to produce an increased magnetic field at the ends by a variety of methods known in the art, including increasing the number of windings in the mirror coils 330, increasing the current through the mirror coils 330, or overlapping the mirror coils 330 with the outer coil 325.

The outer coil 325 and mirror coils 330 are shown in FIG. 25 implemented outside the chamber wall 305; however, they may be inside the chamber 310. In cases where the chamber wall 305 is constructed of a conductive material such as metal, it may be advantageous to place the coils 325, 330 inside the chamber wall 305 because the time that it takes for the magnetic field to diffuse through the wall 305 may be relatively large and thus cause the system 300 to react sluggishly. Similarly, the chamber 310 may be of the shape of a hollow cylinder, the chamber wall 305 forming a long, annular ring. In such a case, the betatron flux coil 320 could be implemented outside of the chamber wall 305 in the center of that annular ring. Preferably, the inner wall forming the center of the annular ring may comprise a non-conducting material such as glass. As will become apparent, the chamber 310 must be of sufficient size and shape to allow the circulating plasma beam or layer 335 to rotate around the principle axis 315 at a given radius.

The chamber wall 305 may be formed of a material having a high magnetic permeability, such as steel. In such a case, the chamber wall 305, due to induced countercurrents in the material, helps to keep the magnetic flux from escaping the chamber 310, "compressing" it. If the chamber wall were to be made of a material having low magnetic permeability, such as plexiglass, another device for containing the magnetic flux would be necessary. In such a case, a series of closed-loop, flat metal rings could be provided. These rings, known in the art as flux delimiters, would be provided within the outer coils 325 but outside the circulating plasma beam 335. Further, these flux delimiters could be passive or active, wherein the active flux delimiters would be driven with a predetermined current to greater facilitate the containment of magnetic flux within the chamber 310. Alternatively, the outer coils 325 themselves could serve as flux delimiters.

As explained above, a circulating plasma beam 335, comprising charged particles, may be contained within the chamber 310 by the Lorentz force caused by the magnetic field due to the outer coil 325. As such, the ions in the plasma beam 335 are magnetically contained in large betatron orbits about the flux lines from the outer coil 325, which are parallel to the principle axis 315. One or more beam injection ports 340 are also provided for adding plasma ions to the circulating plasma beam 335 in the chamber 310. In a preferred embodiment, the injector ports 340 are adapted to inject an ion beam at about the same radial position from the principle axis 315 where the circulating plasma beam 335 is contained (i.e., around the null surface). Further, the injector ports 340 are adapted to inject ion beams 350 (See FIG. 28) tangent to and in the direction of the betatron orbit of the contained plasma beam 335.

Also provided are one or more background plasma sources 345 for injecting a cloud of non-energetic plasma into the chamber 310. In a preferred embodiment, the background plasma sources 345 are adapted to direct plasma 335 toward the axial center of the chamber 310. It has been found that directing the plasma this way helps to better contain the plasma 335 and leads to a higher density of plasma 335 in the containment region within the chamber 310.

Formation of the FRC

Conventional procedures used to form a FRC primarily employ the theta pinch-field reversal procedure. In this conventional method, a bias magnetic field is applied by external coils surrounding a neutral gas back-filled chamber. Once this has occurred, the gas is ionized and the bias magnetic field is frozen in the plasma. Next, the current in the external coils is rapidly reversed and the oppositely oriented magnetic field lines connect with the previously frozen lines to form the closed topology of the FRC (see FIG. 8). This formation process is largely empirical and there exists almost no means of controlling the formation of the FRC. The method has poor reproducibility and no tuning capability as a result.

In contrast, the FRC formation methods of the present invention allow for ample control and provide a much more transparent and reproducible process. In fact, the FRC formed by the methods of the present invention can be tuned and its shape as well as other properties can be directly influenced by manipulation of the magnetic field applied by the outer field coils 325. Formation of the FRC by methods of the present inventions also results in the formation of the electric field and potential well in the manner described in detail above. Moreover, the present methods can be easily extended to accelerate the FRC to reactor level parameters and high-energy fuel currents, and advantageously enables the classical confinement of the ions. Furthermore, the technique can be employed in a compact device and is very robust as well as easy to implement—all highly desirable characteristics for reactor systems.

In the present methods, FRC formation relates to the circulating plasma beam 335. It can be appreciated that the circulating plasma beam 335, because it is a current, creates a poloidal magnetic field, as would an electrical current in a circular wire. Inside the circulating plasma beam 335, the magnetic self-field that it induces opposes the externally applied magnetic field due to the outer coil 325. Outside the plasma beam 335, the magnetic self-field is in the same direction as the applied magnetic field. When the plasma ion current is sufficiently large, the self-field overcomes the applied field, and the magnetic field reverses inside the circulating plasma beam 335, thereby forming the FRC topology as shown in FIGS. 8 and 10.

The requirements for field reversal can be estimated with a simple model. Consider an electric current $I_P$ carried by a ring of major radius $r_0$ and minor radius $a \ll r_0$. The magnetic field at the center of the ring normal to the ring is $B_p = 2\pi I_p/(cr_o)$. Assume that the ring current $I_P = N_p e(\omega_0/2\pi)$ is carried by $N_p$ ions that have an angular velocity $\Omega_0$. For a single ion circulating at radius $r_0 = V_0/\Omega_0$, $\Omega_0 = eB_0/m_i c$ is the cyclotron frequency for an external magnetic field $B_0$. Assume $V_0$ is the average velocity of the beam ions. Field reversal is defined as $$B_p = \frac{N_p e \Omega_0}{r_0 c} \geq 2B_0, \tag{64}$$

which implies that $N_p > 2 \, r_0/\alpha_i$, and $$I_p \geq \frac{eV_0}{\pi \alpha_i}, \tag{65}$$

where $\alpha_i = e^2/m_i c^2 = 1.57 \times 10^{-16}$ cm and the ion beam energy is $$\frac{1}{2} m_i V_0^2.$$

In the one-dimensional model, the magnetic field from the plasma current is $B_p = (2\pi/c) i_p$, where $i_p$ is current per unit of length. The field reversal requirement is $i_p > eV_0/\pi r_0 \alpha_i = 0.225$ kA/cm, where $B_0 = 69.3$ G and $$\frac{1}{2} m_i V_0^2 = 100 \text{ eV}.$$

For a model with periodic rings and $B_z$ is averaged over the axial coordinate $\langle B_z \rangle = (2\pi/c)(I_p/s)$ (s is the ring spacing), if $s = r_0$, this model would have the same average magnetic field as the one dimensional model with $i_p = I_p/s$.

Combined Beam/Betatron Formation Technique

A preferred method of forming a FRC within the confinement system 300 described above is herein termed the combined beam/betatron technique. This approach combines low energy beams of plasma ions with betatron acceleration using the betatron flux coil 320.

Figure 26:
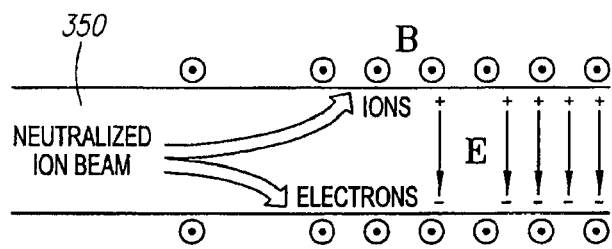
FIG. 26 shows a neutralized ion beam as it is electrically polarized before entering a confining chamber.
Figure 27:
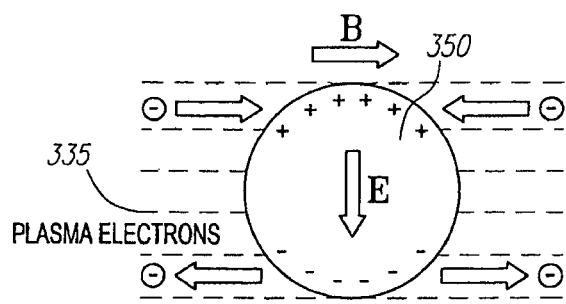
FIG. 27 is a head-on view of a neutralized ion beam as it contacts plasma in a confining chamber.

The first step in this method is to inject a substantially annular cloud layer of background plasma in the chamber 310 using the background plasma sources 345. Outer coil 325 produces a magnetic field inside the chamber 310, which magnetizes the background plasma. At short intervals, low energy ion beams are injected into the chamber 310 through the injector ports 340 substantially transverse to the externally applied magnetic field within the chamber 310. As explained above, the ion beams are trapped within the chamber 310 in large betatron orbits by this magnetic field. The ion beams may be generated by an ion accelerator, such as an accelerator comprising an ion diode and a Marx generator. (see R. B. Miller, *An Introduction to the Physics of Intense Charged Particle Beams*, (1982)). As one of skill in the art can appreciate, the externally applied magnetic field will exert a Lorentz force on the injected ion beam as soon as it enters the chamber 310; however, it is desired that the beam not deflect, and thus not enter a betatron orbit, until the ion beam reaches the circulating plasma beam 335. To solve this problem, the ion beams are neutralized with electrons and directed through a substantially constant unidirectional magnetic field before entering the chamber 310. As illustrated in FIG. 26, when the ion beam 350 is directed through an appropriate magnetic field, the positively charged ions and negatively charged electrons separate. The ion beam 350 thus acquires an electric self-polarization due to the magnetic field. This magnetic field may be produced by, e.g., a permanent magnet or by an electromagnet along the path of the ion beam. When subsequently introduced into the confinement chamber 310, the resultant electric field balances the magnetic force on the beam particles, allowing the ion beam to drift undeflected. FIG. 27 shows a head-on view of the ion beam 350 as it contacts the plasma 335. As depicted, electrons from the plasma 335 travel along magnetic field lines into or out of the beam 350, which thereby drains the beam's electric polarization. When the beam is no longer electrically polarized, the beam joins the circulating plasma beam 335 in a betatron orbit around the principle axis 315, as shown in FIG. 25.

When the plasma beam 335 travels in its betatron orbit, the moving ions comprise a current, which in turn gives rise to a poloidal magnetic self-field. To produce the FRC topology within the chamber 310, it is necessary to increase the velocity of the plasma beam 335, thus increasing the magnitude of the magnetic self-field that the plasma beam 335 causes. When the magnetic self-field is large enough, the direction of the magnetic field at radial distances from the axis 315 within the plasma beam 335 reverses, giving rise to a FRC. (See FIGS. 8 and 10). It can be appreciated that, to maintain the radial distance of the circulating plasma beam 335 in the betatron orbit, it is necessary to increase the applied magnetic field from the outer coil 325 as the plasma beam 335 increases in velocity. A control system is thus provided for maintaining an appropriate applied magnetic field, dictated by the current through the outer coil 325. Alternatively, a second outer coil may be used to provide the additional applied magnetic field that is required to maintain the radius of the plasma beam's orbit as it is accelerated.

Figure 28:
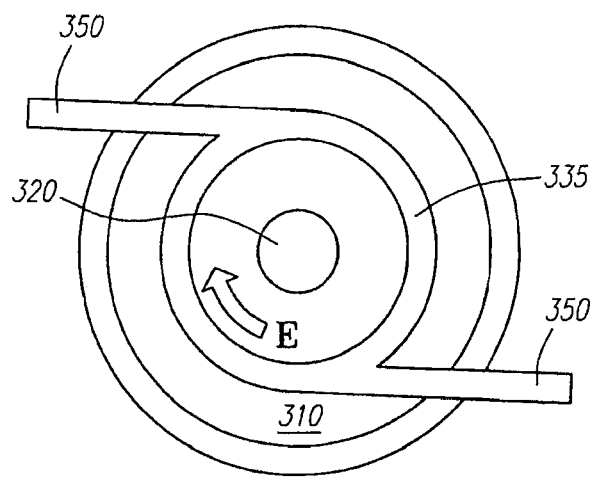
FIG. 28 is a side view schematic of a confining chamber according to a preferred embodiment of a start-up procedure.

To increase the velocity of the circulating plasma beam 335 in its orbit, the betatron flux coil 320 is provided. Referring to FIG. 28, it can be appreciated that increasing a current through the betatron flux coil 320, by Ampere's Law, induces an azimuthal electric field, E, inside the chamber 310. The positively charged ions in the plasma beam 335 are accelerated by this induced electric field, leading to field reversal as described above. When ion beams are added to the circulating plasma beam 335, as described above, the plasma beam 335 depolarizes the ion beams.

For field reversal, the circulating plasma beam 335 is preferably accelerated to a rotational energy of about 100 eV, and preferably in a range of about 75 eV to 125 eV. To reach fusion relevant conditions, the circulating plasma beam 335 is preferably accelerated to about 200 keV and preferably to a range of about 100 keV to 3.3 MeV. In developing the necessary expressions for the betatron acceleration, the acceleration of single particles is first considered. The gyroradius of ions $r=V/\Omega_i$ will change because V increases and the applied magnetic field must change to maintain the radius of the plasma beam's orbit, $r_0 = V/\Omega_c$ $$\frac{\partial r}{\partial t} = \frac{1}{\Omega}\left[\frac{\partial V}{\partial t} - \frac{V}{\Omega_i}\frac{\partial \Omega_i}{\partial t}\right] = 0, \tag{66}$$

where $$\frac{\partial V}{\partial t} = \frac{r_0 e}{m_i c}\frac{\partial B_c}{\partial t} = \frac{eE_\theta}{m_i} = -\frac{e}{m_i c}\frac{1}{2\pi r_0}\frac{\partial \Psi}{\partial t}, \tag{67}$$

and $\Psi$ is the magnetic flux:

$$\Psi = \int_0^{r_0} B_z 2\pi r\, dr = \pi r_0^2 \langle B_z \rangle, \tag{68}$$

where $$\langle B_z \rangle = -B_F \left(\frac{r_a}{r_0}\right)^2 - B_c\left[1 - \left(\frac{r_a}{r_0}\right)^2\right]. \tag{69}$$

From Eq. 67, it follows that $$\frac{\partial \langle B_z \rangle}{\partial t} = -2\frac{\partial B_c}{\partial t}, \tag{70}$$

and $\langle B_z \rangle = -2B_c + B_0$, assuming that the initial values of $B_F$ and $B_c$ are both $B_0$. Eq. 67 can be expressed as $$\frac{\partial V}{\partial t} = -\frac{e}{2m_i c}r_0 \frac{\partial \langle B_z \rangle}{\partial t}. \tag{71}$$

After integration from the initial to final states where $$\frac{1}{2}mV_0^2 = W_0 \text{ and } \frac{1}{2}mV^2 = W,$$

the final values of the magnetic fields are:

$$B_c = B_0 \sqrt{\frac{W}{W_0}} = 2.19 \text{ kG} \tag{72}$$

and $$B_F = B_0 \left[\sqrt{\frac{W}{W_0}} + \left(\frac{r_0}{r_a}\right)^2\left(\sqrt{\frac{W}{W_0}} - 1\right)\right] = 10.7 \text{ kG}, \tag{73}$$

assuming $B_0 = 69.3$ G, $W/W_0 = 1000$, and $r_0/r_a = 2$. This calculation applies to a collection of ions, provided that they are all located at nearly the same radius $r_0$ and the number of ions is insufficient to alter the magnetic fields.

The modifications of the basic betatron equations to accommodate the present problem will be based on a one-dimensional equilibrium to describe the multi-ring plasma beam, assuming the rings have spread out along the field lines and the z-dependence can be neglected. The equilibrium is a self-consistent solution of the Vlasov-Maxwell equations that can be summarized as follows:

(a) The density distribution is $$n = \frac{n_m}{\cosh^2\left(\frac{r^2 - r_0^2}{r_0 \Delta r}\right)}, \tag{74}$$

which applies to the electrons and protons (assuming quasi neutrality); $r_0$ is the position of the density maximum; and $\Delta r$ is the width of the distribution; and (b) The magnetic field is $$B_z = -B_c - \frac{2\pi I_p}{c}\tanh\left(\frac{r^2 - r_0^2}{r_0 \Delta r}\right), \tag{75}$$

where $B_c$ is the external field produced by the outer coil 325. Initially, $B_c = B_0$. This solution satisfies the boundary conditions that $r = r_a$ and $r = r_b$ are conductors ($B_{normal} = 0$) and equipotentials with potential $\Phi = 0$. The boundary conditions are satisfied if $r_0^2 = (r_a^2 + r_b^2)/2$. $r_a = 10$ cm and $r_0 = 20$ cm, so it follows that $r_b = 26.5$ cm. $I_p$ is the plasma current per unit length.

The average velocities of the beam particles are $V_i = r_0 \omega_i$ and $V_e = r_0 \omega_e$, which are related by the equilibrium condition:

$$\omega_e = \omega_i\left(1 - \frac{\omega_i}{\Omega_i}\right), \tag{76}$$

where $\Omega_i = eB_c/(m_i c)$. Initially, it is assumed $B_c = B_0$, $\omega_i = \Omega_i$, and $\omega_e = 0$. (In the initial equilibrium there is an electric field such that the $\vec{E}\times\vec{B}$ and the $\nabla B \times \vec{B}$ drifts cancel. Other equilibria are possible according to the choice of $B_c$.) The equilibrium equations are assumed to be valid if $\omega_i$ and $B_c$ are slowly varying functions of time, but $r_0 = V_i/\Omega_i$ remains constant. The condition for this is the same as Eq. 66. Eq. 67 is also similar, but the flux function $\Psi$ has an additional term, i.e., $\Psi = \pi r_0^2 \langle B_z \rangle$ where $$\langle B_z \rangle = \overline{B}_z + \frac{2\pi}{c}I_p\left(\frac{r_b^2 - r_a^2}{r_b^2 + r_a^2}\right) \tag{77}$$

and $$\overline{B}_z = -B_F\left(\frac{r_a}{r_0}\right)^2 - B_c\left[1 - \left(\frac{r_a}{r_0}\right)^2\right]. \tag{78}$$

The magnetic energy per unit length due to the beam current is $$\int_{r_a}^{r_b} 2\pi r\, dr \left(\frac{B_z - B_c}{8\pi}\right)^2 = \frac{1}{2}L_p I_p^2, \tag{79}$$

from which

-continued $$L_p = \frac{r_b^2 - r_a^2}{r_b^2 + r_a^2} \frac{2\pi^2 r_0^2}{c^2} \quad (80)$$

and $$\langle B_z \rangle = \overline{B}_z + \frac{c}{\pi r_0^2} L_p I_p.$$

The betatron condition of Eq. 70 is thus modified so that $$\frac{\partial \overline{B}_z}{\partial t} = -2 \frac{\partial B_c}{\partial t} - \frac{L_p c}{\pi r_0^2} \frac{\partial I_p}{\partial t}, \quad (81)$$

and Eq. 67 becomes:

$$\frac{\partial V_i}{\partial t} = \frac{e}{m_i} \frac{r_0}{c} \frac{\partial B_c}{\partial t} = -\frac{e}{2m_i c} r_0 \frac{\partial \overline{B}_z}{\partial t} - \frac{e}{m_i} \frac{L_p}{2\pi r_0} \frac{\partial I_p}{\partial t}. \quad (82)$$

After integrating, $$\Delta \overline{B}_z = -2B_0 \left[ 1 + \frac{r_b^2 - r_a^2}{r_0^2} \right] \left[ \sqrt{\frac{W}{W_0}} - 1 \right]. \quad (83)$$

For $W_0 = 100$ eV and $W = 100$ keV, $\Delta \vec{B}_z = -7.49$ kG. Integration of Eqs. 81 and 82 determines the value of the magnetic field produced by the field coil:

$$B_c = B_0 \sqrt{\frac{W}{W_0}} = 2.19 \text{ kG} \quad (84)$$

and $$B_F = B_{F0} - \left(\frac{r_0}{r_a}\right)^2 \Delta \overline{B}_z - \left(\frac{r_0^2 - r_a^2}{r_a^2}\right) \Delta B_c = 25 \text{ kG}. \quad (85)$$

If the final energy is 200 keV, $B_c = 3.13$ kG and $B_F = 34.5$ kG. The magnetic energy in the flux coil would be $$\frac{B_F^2}{8\pi} \pi r_F^2 l = 172 \text{ kJ}.$$

The plasma current is initially 0.225 kA/cm corresponding to a magnetic field of 140 G, which increases to 10 kA/cm and a magnetic field of 6.26 kG. In the above calculations, the drag due to Coulomb collisions has been neglected. In the injection/trapping phase, it was equivalent to 0.38 volts/cm. It decreases as the electron temperature increases during acceleration. The inductive drag, which is included, is 4.7 volts/cm, assuming acceleration to 200 keV in 100 μs.

The betatron flux coil 320 also balances the drag from collisions and inductance. The frictional and inductive drag can be described by the equation:

$$\frac{\partial V_b}{\partial t} = -V_b \left[ \frac{1}{t_{be}} + \frac{1}{t_{bi}} \right] - \frac{e}{m_b} \frac{L}{2\pi r_0} \frac{\partial I_b}{\partial t}, \quad (86)$$

where $(T_i/m_i) < V_b < (T_e/m)$. Here, $V_b$ is the beam velocity, $T_e$ and $T_i$ are electron and ion temperatures, $I_b$ is the beam ion current, and $$L = 0.01257 r_0 \left[ \ln\left(\frac{8 r_0}{a}\right) - \frac{7}{4} \right] = 0.71 \text{ μH}$$

is the ring inductance. Also, $r_0 = 20$ cm and $a = 4$ cm.

The Coulomb drag is determined by $$t_{be} = \frac{3}{4} \sqrt{\frac{2}{\pi}} \left(\frac{m_i}{m}\right) \frac{T_e^{3/2}}{ne^4 \ln \Lambda} = 195 \text{ μsec} \quad (87)$$

$$t_{bi} = \frac{2\sqrt{2m_i}}{4\pi n e^4 \ln \Lambda} W_b^{3/2} = 54.8 \text{ μsec}.$$

To compensate the drag, the betatron flux coil 320 must provide an electric field of 1.9 volts/cm (0.38 volts/cm for the Coulomb drag and 1.56 volts/cm for the inductive drag). The magnetic field in the betatron flux coil 320 must increase by 78 Gauss/μs to accomplish this, in which case $V_b$ will be constant. The rise time of the current to 4.5 kA is 18 Us, so that the magnetic field $B_F$ will increase by 1.4 kG. The magnetic field energy required in the betatron flux coil 320 is $$\frac{B_F^2}{8\pi} \times \pi r_F^2 l = 394 \text{ Joules } (l = 115 \text{ cm}). \quad (88)$$

Betatron Formation Technique

Another preferred method of forming a FRC within the confinement system 300 is herein termed the betatron formation technique. This technique is based on driving the betatron induced current directly to accelerate a circulating plasma beam 335 using the betatron flux coil 320. A preferred embodiment of this technique uses the confinement system 300 depicted in FIG. 25, except that the injection of low energy ion beams is not necessary.

As indicated, the main component in the betatron formation technique is the betatron flux coil 320 mounted in the center and along the axis of the chamber 310. Due to its separate parallel windings construction, the coil 320 exhibits very low inductance and, when coupled to an adequate power source, has a low LC time constant, which enables rapid ramp up of the current in the flux coil 320.

Preferably, formation of the FRC commences by energizing the external field coils 325, 330. This provides an axial guide field as well as radial magnetic field components near the ends to axially confine the plasma injected into the chamber 310. Once sufficient magnetic field is established, the background plasma sources 345 are energized from their own power supplies. Plasma emanating from the guns streams along the axial guide field and spreads slightly due to its temperature. As the plasma reaches the mid-plane of the chamber 310, a continuous, axially extending, annular layer of cold, slowly moving plasma is established.

At this point the betatron flux coil 320 is energized. The rapidly rising current in the coil 320 causes a fast changing axial flux in the coil's interior. By virtue of inductive effects this rapid increase in axial flux causes the generation of an azimuthal electric field E (see FIG. 29), which permeates the space around the flux coil. By Maxwell's equations, this electric field is directly proportional to the change in strength of the magnetic flux inside the coil, i.e.: a faster betatron coil current ramp-up will lead to a stronger electric field.

Figure 29:
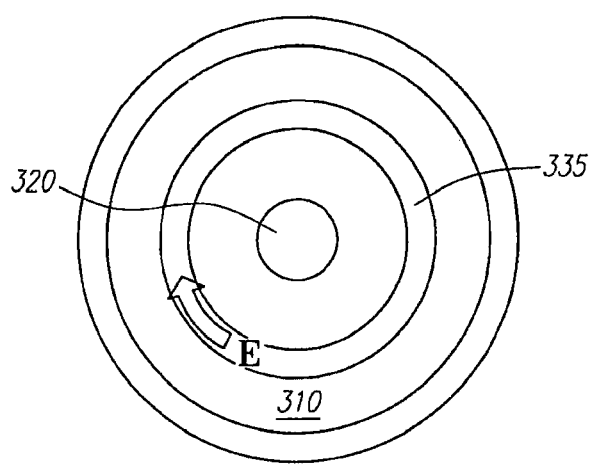
FIG. 29 is a side view schematic of a confining chamber according to another preferred embodiment of a start-up procedure.

The inductively created electric field couples to the charged particles in the plasma and causes a ponderomotive force, which accelerates the particles in the annular plasma layer. Electrons, by virtue of their smaller mass, are the first species to experience acceleration. The initial current formed by this process is, thus, primarily due to electrons. However, sufficient acceleration time (around hundreds of micro-seconds) will eventually also lead to ion current. Referring to FIG. 29, this electric field accelerates the electrons and ions in opposite directions. Once both species reach their terminal velocities, current is carried about equally by ions and electrons.

As noted above, the current carried by the rotating plasma gives rise to a self magnetic field. The creation of the actual FRC topology sets in when the self magnetic field created by the current in the plasma layer becomes comparable to the applied magnetic field from the external field coils 325, 330. At this point magnetic reconnection occurs and the open field lines of the initial externally produced magnetic field begin to close and form the FRC flux surfaces (see FIGS. 8 and 10).

The base FRC established by this method exhibits modest magnetic field and particle energies that are typically not at reactor relevant operating parameters. However, the inductive electric acceleration field will persist, as long as the current in the betatron flux coil 320 continues to increase at a rapid rate. The effect of this process is that the energy and total magnetic field strength of the FRC continues to grow. The extent of this process is, thus, primarily limited by the flux coil power supply, as continued delivery of current requires a massive energy storage bank. However, it is, in principle, straightforward to accelerate the system to reactor relevant conditions.

For field reversal, the circulating plasma beam 335 is preferably accelerated to a rotational energy of about 100 eV, and preferably in a range of about 75 eV to 125 eV. To reach fusion relevant conditions, the circulating plasma beam 335 is preferably accelerated to about 200 keV and preferably to a range of about 100 keV to 3.3 MeV. When ion beams are added to the circulating plasma beam 335, as described above, the plasma beam 335 depolarizes the ion beams.

Experiments—Beam Trapping and FRC Formation

Experiment 1: Propagating and Trapping of a Neutralized Beam in a Magnetic Containment Vessel to Create an FRC.

Beam propagation and trapping were successfully demonstrated at the following parameter levels:
 Vacuum chamber dimensions: about 1 m diameter, 1.5 m length.
 Betatron coil radius of 10 cm.
 Plasma beam orbit radius of 20 cm.
 Mean kinetic energy of streaming beam plasma was measured to be about 100 eV, with a density of about $10^{13}$ cm$^{-3}$, kinetic temperature on the order of 10 eV and a pulse-length of about 20 µs.
 Mean magnetic field produced in the trapping volume was around 100 Gauss, with a ramp-up period of 150 µs. Source: Outer coils and betatron coils.
 Neutralizing background plasma (substantially Hydrogen gas) was characterized by a mean density of about $10^{13}$ cm$^{-3}$, kinetic temperature of less than 10 eV.

The beam was generated in a deflagration type plasma gun. The plasma beam source was neutral Hydrogen gas, which was injected through the back of the gun through a special puff valve. Different geometrical designs of the electrode assembly were utilized in an overall cylindrical arrangement. The charging voltage was typically adjusted between 5 and 7.5 kV. Peak breakdown currents in the guns exceeded 250,000 A. During part of the experimental runs, additional pre-ionized plasma was provided by means of an array of small peripheral cable guns feeding into the central gun electrode assembly before, during or after neutral gas injection. This provided for extended pulse lengths of above 25 µs.

The emerging low energy neutralized beam was cooled by means of streaming through a drift tube of non-conducting material before entering the main vacuum chamber. The beam plasma was also pre-magnetized while streaming through this tube by means of permanent magnets.

The beam self-polarized while traveling through the drift tube and entering the chamber, causing the generation of a beam-internal electric field that offset the magnetic field forces on the beam. By virtue of this mechanism it was possible to propagate beams as characterized above through a region of magnetic field without deflection.

Upon further penetration into the chamber, the beam reached the desired orbit location and encountered a layer of background plasma provided by an array of cable guns and other surface flashover sources. The proximity of sufficient electron density caused the beam to loose its self-polarization field and follow single particle like orbits, essentially trapping the beam. Faraday cup and B-dot probe measurements confirmed the trapping of the beam and its orbit. The beam was observed to have performed the desired circular orbit upon trapping. The beam plasma was followed along its orbit for close to ¾ of a turn. The measurements indicated that continued frictional and inductive losses caused the beam particles to loose sufficient energy for them to curl inward from the desired orbit and hit the betatron coil surface at around the ¾ turn mark. To prevent this, the losses could be compensated by supplying additional energy to the orbiting beam by inductively driving the particles by means of the betatron coil.

Experiment 2: FRC Formation Utilizing the Combined Beam/Betatron Formation Technique.

FRC formation was successfully demonstrated utilizing the combined beam/betatron formation technique. The combined beam/betatron formation technique was performed experimentally in a chamber 1 m in diameter and 1.5 m in length using an externally applied magnetic field of up to 500 G, a magnetic field from the betatron flux coil 320 of up to 5 kG, and a vacuum of $1.2 \times 10^{-5}$ torr. In the experiment, the background plasma had a density of $10^{13}$ cm$^{-3}$ and the ion beam was a neutralized Hydrogen beam having a density of $1.2 \times 10^{13}$ cm$^{-3}$, a velocity of $2 \times 10^7$ cm/s, and a pulse length of around 20 µs (at half height). Field reversal was observed.

Experiment 3: FRC Formation Utilizing the Betatron Formation Technique.

FRC formation utilizing the betatron formation technique was successfully demonstrated at the following parameter levels:
 Vacuum chamber dimensions: about 1 m diameter, 1.5 m length.
 Betatron coil radius of 10 cm.
 Plasma orbit radius of 20 cm.
 Mean external magnetic field produced in the vacuum chamber was up to 100 Gauss, with a ramp-up period of 150 µs and a mirror ratio of 2 to 1. (Source: Outer coils and betatron coils).
 The background plasma (substantially Hydrogen gas) was characterized by a mean density of about $10^{13}$ cm$^{-3}$, kinetic temperature of less than 10 eV.
 The lifetime of the configuration was limited by the total energy stored in the experiment and generally was around 30 µs.

The experiments proceeded by first injecting a background plasma layer by two sets of coaxial cable guns mounted in a circular fashion inside the chamber. Each collection of 8 guns was mounted on one of the two mirror coil assemblies. The guns were azimuthally spaced in an equidistant fashion and offset relative to the other set. This arrangement allowed for the guns to be fired simultaneously and thereby created an annular plasma layer.

Upon establishment of this layer, the betatron flux coil was energized. Rising current in the betatron coil windings caused an increase in flux inside the coil, which gave rise to an azimuthal electric field curling around the betatron coil. Quick ramp-up and high current in the betatron flux coil produced a strong electric field, which accelerated the annular plasma layer and thereby induced a sizeable current. Sufficiently strong plasma current produced a magnetic self-field that altered the externally supplied field and caused the creation of the field reversed configuration. Detailed measurements with B-dot loops identified the extent, strength and duration of the FRC.

Figure 30:
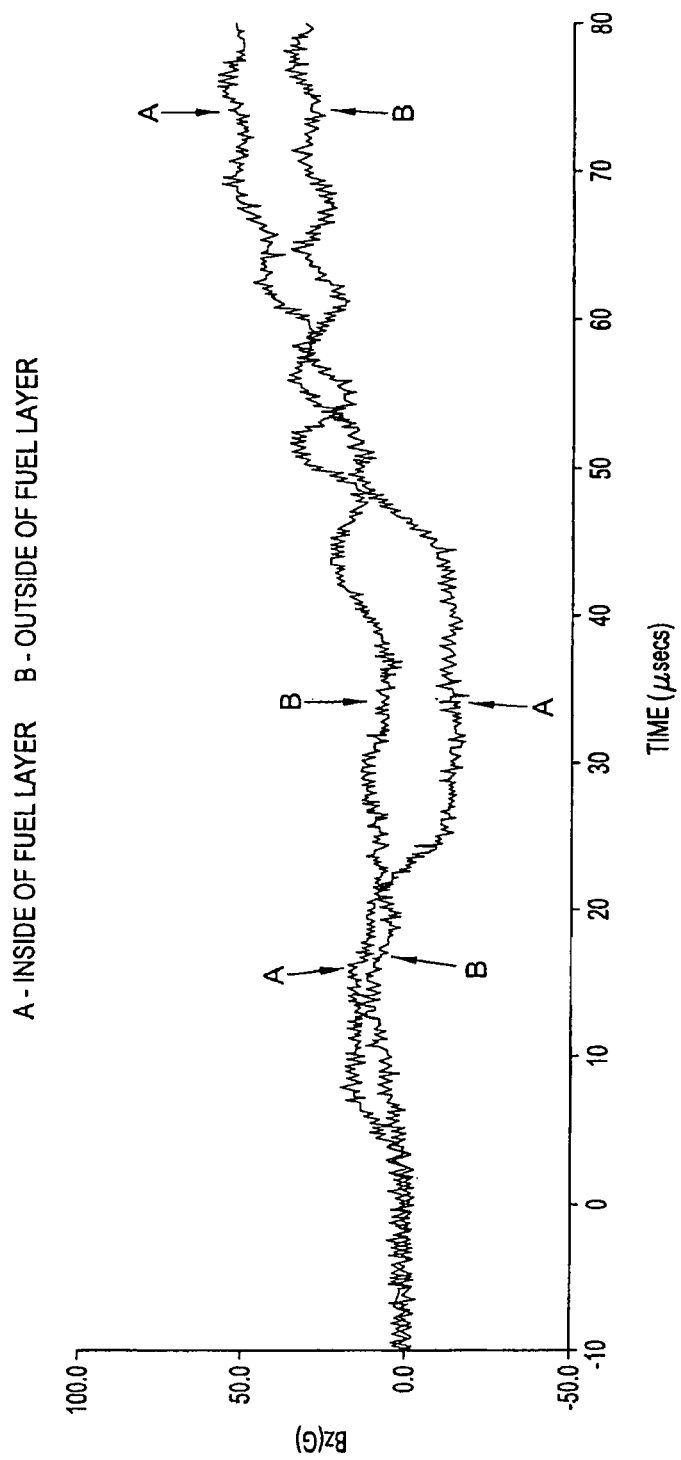
FIG. 30 shows traces of B-dot probe indicating the formation of a FRC.

An example of typical data is shown by the traces of B-dot probe signals in FIG. 30. The data curve A represents the absolute strength of the axial component of the magnetic field at the axial mid-plane (75 cm from either end plate) of the experimental chamber and at a radial position of 15 cm. The data curve B represents the absolute strength of the axial component of the magnetic field at the chamber axial mid-plane and at a radial position of 30 cm. The curve A data set, therefore, indicates magnetic field strength inside of the fuel plasma layer (between betatron coil and plasma) while the curve B data set depicts the magnetic field strength outside of the fuel plasma layer. The data clearly indicates that the inner magnetic field reverses orientation (is negative) between about 23 and 47 µs, while the outer field stays positive, i.e., does not reverse orientation. The time of reversal is limited by the ramp-up of current in the betatron coil. Once peak current is reached in the betatron coil, the induced current in the fuel plasma layer starts to decrease and the FRC rapidly decays. Up to now the lifetime of the FRC is limited by the energy that can be stored in the experiment. As with the injection and trapping experiments, the system can be upgraded to provide longer FRC lifetime and acceleration to reactor relevant parameters.

Overall, this technique not only produces a compact FRC, but it is also robust and straightforward to implement. Most importantly, the base FRC created by this method can be easily accelerated to any desired level of rotational energy and magnetic field strength. This is crucial for fusion applications and classical confinement of high-energy fuel beams.

Experiment 4: FRC Formation Utilizing the Betatron Formation Technique.

An attempt to form an FRC utilizing the betatron formation technique has been performed experimentally in a chamber 1 m in diameter and 1.5 m in length using an externally applied magnetic field of up to 500 G, a magnetic field from the betatron flux coil 320 of up to 5 kG, and a vacuum of $5 \times 10^{-6}$ torr. In the experiment, the background plasma comprised substantially Hydrogen with of a density of $10^{13}$ cm$^{-3}$ and a lifetime of about 40 µs. Field reversal was observed.

Fusion

Significantly, these two techniques for forming a FRC inside of a containment system 300 described above, or the like, can result in plasmas having properties suitable for causing nuclear fusion therein. More particularly, the FRC formed by these methods can be accelerated to any desired level of rotational energy and magnetic field strength. This is crucial for fusion applications and classical confinement of high-energy fuel beams. In the confinement system 300, therefore, it becomes possible to trap and confine high-energy plasma beams for sufficient periods of time to cause a fusion reaction therewith.

To accommodate fusion, the FRC formed by these methods is preferably accelerated to appropriate levels of rotational energy and magnetic field strength by betatron acceleration. Fusion, however, tends to require a particular set of physical conditions for any reaction to take place. In addition, to achieve efficient burn-up of the fuel and obtain a positive energy balance, the fuel has to be kept in this state substantially unchanged for prolonged periods of time. This is important, as high kinetic temperature and/or energy characterize a fusion relevant state. Creation of this state, therefore, requires sizeable input of energy, which can only be recovered if most of the fuel undergoes fusion. As a consequence, the confinement time of the fuel has to be longer than its burn time. This leads to a positive energy balance and consequently net energy output.

A significant advantage of the present invention is that the confinement system and plasma described herein are capable of long confinement times, i.e., confinement times that exceed fuel burn times. A typical state for fusion is, thus, characterized by the following physical conditions (which tend to vary based on fuel and operating mode):

Average ion temperature: in a range of about 30 to 230 keV and preferably in a range of about 80 keV to 230 keV Average electron temperature: in a range of about 30 to 100 keV and preferably in a range of about 80 to 100 keV Coherent energy of the fuel beams (injected ion beams and circulating plasma beam): in a range of about 100 keV to 3.3 MeV and preferably in a range of about 300 keV to 3.3 MeV.

Total magnetic field: in a range of about 47.5 to 120 kG and preferably in a range of about 95 to 120 kG (with the externally applied field in a range of about 2.5 to 15 kG and preferably in a range of about 5 to 15 kG).

Classical Confinement time: greater than the fuel burn time and preferably in a range of about 10 to 100 seconds.

Fuel ion density: in a range of about $10^{14}$ to less than $10^{16}$ cm$^{-3}$ and preferably in a range of about $10^{14}$ to $10^{15}$ cm$^{-3}$.

Total Fusion Power: preferably in a range of about 50 to 450 kW/cm (power per cm of chamber length)

To accommodate the fusion state illustrated above, the FRC is preferably accelerated to a level of coherent rotational energy preferably in a range of about 100 keV to 3.3 MeV, and more preferably in a range of about 300 keV to 3.3 MeV, and a level of magnetic field strength preferably in a range of about 45 to 120 kG, and more preferably in a range of about 90 to 115 kG. At these levels, high energy ion beams can be injected into the FRC and trapped to form a plasma beam layer wherein the plasma beam ions are magnetically confined and the plasma beam electrons are electrostatically confined.

Preferably, the electron temperature is kept as low as practically possible to reduce the amount of bremsstrahlung radiation, which can, otherwise, lead to radiative energy losses. The electrostatic energy well of the present invention provides an effective means of accomplishing this.

The ion temperature is preferably kept at a level that provides for efficient burn-up since the fusion cross-section is a function of ion temperature. High direct energy of the fuel ion beams is essential to provide classical transport as discussed in this application. It also minimizes the effects of instabilities on the fuel plasma. The magnetic field is consistent with the beam rotation energy. It is partially created by the plasma beam (self-field) and in turn provides the support and force to keep the plasma beam on the desired orbit.

Fusion Products

The fusion products are born predominantly near the null surface from where they emerge by diffusion towards the separatrix 84 (see FIG. 8). This is due to collisions with electrons (as collisions with ions do not change the center of mass and therefore do not cause them to change field lines). Because of their high kinetic energy (product ions have much higher energy than the fuel ions), the fusion products can readily cross the separatrix 84. Once they are beyond the separatrix 84, they can leave along the open field lines 80 provided that they experience scattering from ion-ion collisions. Although this collisional process does not lead to diffusion, it can change the direction of the ion velocity vector such that it points parallel to the magnetic field. These open field lines 80 connect the FRC topology of the core with the uniform applied field provided outside the FRC topology. Product ions emerge on different field lines, which they follow with a distribution of energies; advantageously in the form of a rotating annular beam. In the strong magnetic fields found outside the separatrix 84 (typically around 100 kG), the product ions have an associated distribution of gyro-radii that varies from a minimum value of about 1 cm to a maximum of around 3 cm for the most energetic product ions.

Initially the product ions have longitudinal as well as rotational energy characterized by $\frac{1}{2} M(v_{par})^2$ and $\frac{1}{2} M(v_{perp})^2$. $v_{perp}$ is the azimuthal velocity associated with rotation around a field line as the orbital center. Since the field lines spread out after leaving the vicinity of the FRC topology, the rotational energy tends to decrease while the total energy remains constant. This is a consequence of the adiabatic invariance of the magnetic moment of the product ions. It is well known in the art that charged particles orbiting in a magnetic field have a magnetic moment associated with their motion. In the case of particles moving along a slow changing magnetic field, there also exists an adiabatic invariant of the motion described by $\frac{1}{2} M(v_{perp})^2/B$. The product ions orbiting around their respective field lines have a magnetic moment and such an adiabatic invariant associated with their motion. Since B decreases by a factor of about 10 (indicated by the spreading of the field lines), it follows that $v_{perp}$ will likewise decrease by about 3.2. Thus, by the time the product ions arrive at the uniform field region their rotational energy would be less than 5% of their total energy; in other words almost all the energy is in the longitudinal component.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method of forming a field reversed configuration (FRC) magnetic field about a plasma of charged particles comprising the steps of
    creating a magnetic guide field within a cylindrical chamber having a longitudinal axis, wherein the magnetic guide field having field lines axially extending within the chamber parallel to the longitudinal axis,
    injecting a plasma of charged electron and ion particles into the chamber toward a midplane of the chamber,
    generating an azimuthal electric field within the chamber coupling to the charged electron and ion particles of the plasma causing ponderomotive forces causing the charged electron and ion particles to accelerate and the plasma to rotate within the chamber and form a magnetic poloidal self field surrounding the rotating plasma due to the rotating plasma's current, thereby creating and rapidly increasing an axial magnetic flux within the chamber, and increasing a current running through a betatron flux coil concentric with a principle axis of the chamber,
    increasing the rotating plasma's rotational energy to increase the self-field's magnitude to a level that overcomes a guide field axially extending within the chamber causing the formation of a magnetic field within the chamber with field reversed topology.

2. The method of claim 1 further comprising the step of accelerating the rotating plasma to increase the rotational energy of the rotating plasma from a first level of rotational energy to a second level of rotational energy by increasing the rate of change of the current running through the betatron flux coil.

3. The method of claim 1 wherein the step of creating the magnetic guide field includes energizing a plurality of field coils and mirror coils extending about the chamber.

4. The method of claim 1 further comprising the step of adjusting the magnitude of the guide field to adjust the radial size of the rotating plasma.

5. The method of claim 1 further comprising the step of accelerating the rotating plasma to a level of rotational energy in a range of about 100 keV to 3.3 MeV.

6. The method of claim 5 wherein the step of accelerating the rotating plasma includes the steps of injecting ion beams with an energy level in a range of about 100 keV to 3.3 MeV into the magnetic field with field reversal within the chamber and trapping the beams in betatron orbits within the chamber.

7. The method of claim 6 further comprising the step of adjusting the magnitude of the magnetic guide field to adjust a magnitude of an electrostatic well formed within the chamber in conjunction with the magnetic field with field reversal wherein the magnitude of the electrostatic well is a function of the magnitude of the magnetic guide field and the injected ion beams.

8. The method of claim 7 further comprising the steps of magnetically confining ions within the magnetic field having field reversed topology, and electrostatically confining electrons within the electrostatic well.

9. The method of claim 1 wherein the rotational energy of the rotating plasma is increased to a range of about 75 eV to 125 eV.

10. The method of claim 2 wherein the rotational energy of the rotating plasma is increased to a range of about 100 keV to 3.3 MeV.

11. The method of claim 6 further comprising the steps of neutralizing the ion beams with a plurality of electrons and electrically polarizing the neutralized ion beams.

12. The method of claim 11 further comprising the steps of drifting the polarized and neutralized ion beams un-deflected through the magnetic field with field reversal, and depolarizing the ion beams.

13. The method of claim 12 wherein the step of depolarizing the ion beams includes the steps of contacting the ion beam with the plasma within the magnetic field with field reversal and draining the electric polarization from the ion beams.

14. The method of claim 13 wherein the step of injecting the ion beams includes injecting the ion beams orthogonal to a principal axis of the chamber and at a radial position from the principle axis where the plasma is contained within the magnetic field with field reversal.

15. The method of claim 6 wherein the step of trapping the beams includes exerting a Lorentz force due to the magnetic field with field reversal on the ion beam to bend the ion beam into a betatron orbit.

* * * * *